(12) United States Patent
Kurokawa et al.

(10) Patent No.: US 10,522,103 B2
(45) Date of Patent: Dec. 31, 2019

(54) DISPLAY DEVICE

(71) Applicant: Japan Display Inc., Minato-ku (JP)

(72) Inventors: Tae Kurokawa, Minato-ku (JP); Mamoru Douyou, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 11 days.

(21) Appl. No.: 15/943,875

(22) Filed: Apr. 3, 2018

(65) Prior Publication Data

US 2018/0293947 A1 Oct. 11, 2018

(30) Foreign Application Priority Data

Apr. 10, 2017 (JP) .................................. 2017-077834

(51) Int. Cl.
*G09G 3/36* (2006.01)
*G02F 1/1343* (2006.01)
*G02F 1/1339* (2006.01)

(52) U.S. Cl.
CPC ......... *G09G 3/3611* (2013.01); *G02F 1/1339* (2013.01); *G02F 1/1343* (2013.01)

(58) Field of Classification Search
None
See application file for complete search history.

(56) References Cited

U.S. PATENT DOCUMENTS

2016/0116768 A1 4/2016 Okuyama et al.
2017/0103716 A1* 4/2017 Kita ..................... G02F 1/133
2017/0352329 A1 12/2017 Imai

FOREIGN PATENT DOCUMENTS

JP 2015-069234 4/2015
JP 2016-085452 5/2016

* cited by examiner

*Primary Examiner* — Nicholas J Lee
(74) *Attorney, Agent, or Firm* — Oblon, McClelland, Maier & Neustadt, L.L.P.

(57) ABSTRACT

According to an aspect, a display device includes: a first translucent substrate; a second translucent substrate facing the first translucent substrate; a liquid crystal layer including polymer dispersed liquid crystal sealed between the first translucent substrate and the second translucent substrate; at least one light emitter facing at least one of a side surface of the first translucent substrate or a side surface of the second translucent substrate; and a display controller that controls a color of an image overlapping with a background viewed through the first translucent substrate and the second translucent substrate according to a color of the background.

13 Claims, 22 Drawing Sheets

FIG.25
| | R | G | B |
|---|---|---|---|
| A11 | 75 | 81 | 18 |
| A21 | 61 | 83 | 25 |
| A31 | 78 | 95 | 22 |
| A41 | 87 | 89 | 17 |
| A12 | 42 | 65 | 15 |
| A22 | 44 | 66 | 18 |
| A32 | 221 | 143 | 8 |
| A42 | 156 | 121 | 9 |
| A13 | 29 | 54 | 15 |
| A23 | 33 | 48 | 10 |
| A33 | 229 | 156 | 7 |
| A43 | 152 | 124 | 9 |
| A14 | 47 | 59 | 15 |
| A24 | 22 | 43 | 13 |
| A34 | 71 | 68 | 9 |
| A44 | 59 | 82 | 16 |
T11
| | H | S | V |
|---|---|---|---|
| A11 | 66 | 0.25 | 0.3 |
| A21 | 83 | 0.23 | 0.3 |
| A31 | 74 | 0.29 | 0.4 |
| A41 | 61 | 0.28 | 0.4 |
| A12 | 88 | 0.20 | 0.3 |
| A22 | 87 | 0.19 | 0.3 |
| A32 | 38 | 0.84 | 0.9 |
| A42 | 46 | 0.58 | 0.6 |
| A13 | 99 | 0.15 | 0.2 |
| A23 | 84 | 0.15 | 0.2 |
| A33 | 40 | 0.87 | 0.9 |
| A43 | 48 | 0.56 | 0.6 |
| A14 | 76 | 0.17 | 0.2 |
| A24 | 103 | 0.12 | 0.2 |
| A34 | 57 | 0.24 | 0.3 |
| A44 | 80 | 0.26 | 0.3 |
T12
| | H' | S' | V' |
|---|---|---|---|
| A11 | 0 | 0 | 1 |
| A21 | 0 | 0 | 1 |
| A31 | 0 | 0 | 1 |
| A41 | 0 | 0 | 1 |
| A12 | 0 | 0 | 1 |
| A22 | 0 | 0 | 1 |
| A32 | 240 | 1 | 1 |
| A42 | 240 | 1 | 1 |
| A13 | 0 | 0 | 1 |
| A23 | 0 | 0 | 1 |
| A33 | 240 | 1 | 1 |
| A43 | 240 | 1 | 1 |
| A14 | 0 | 0 | 1 |
| A24 | 0 | 0 | 1 |
| A34 | 0 | 0 | 1 |
| A44 | 0 | 0 | 1 |
T13
| | R' | G' | B' |
|---|---|---|---|
| A11 | 255 | 255 | 255 |
| A21 | 255 | 255 | 255 |
| A31 | 255 | 255 | 255 |
| A41 | 255 | 255 | 255 |
| A12 | 255 | 255 | 255 |
| A22 | 255 | 255 | 255 |
| A32 | 0 | 0 | 255 |
| A42 | 0 | 0 | 255 |
| A13 | 255 | 255 | 255 |
| A23 | 255 | 255 | 255 |
| A33 | 0 | 0 | 255 |
| A43 | 0 | 0 | 255 |
| A14 | 255 | 255 | 255 |
| A24 | 255 | 255 | 255 |
| A34 | 255 | 255 | 255 |
| A44 | 255 | 255 | 255 |
T14

US 10,522,103 B2

DISPLAY DEVICE

CROSS-REFERENCE TO RELATED APPLICATIONS

This application claims priority from Japanese Application No. 2017-077834, filed on Apr. 10, 2017, the contents of which are incorporated by reference herein in its entirety.

BACKGROUND

1. Technical Field

The present disclosure relates to a display device.

2. Description of the Related Art

Japanese Patent Application Laid-open Publication No. 2016-085452 describes a display device including a light modulation layer and a light source. In this display device, the light modulation layer is disposed between a pair of transparent substrates and includes a plurality of light modulation elements that have predetermined refractive index anisotropy and are different in responsiveness to an electric field generated by electrodes provided on the transparent substrates. The light source emits light of a predetermined color into the light modulation layer through a side surface of the light modulation layer. The light modulation layer transmits the incident light received from the light source when the electric field is not generated, and scatters the incident light and emits the scattered light to the transparent substrates when the electric field is generated.

SUMMARY

According to an aspect, a display device includes: a first translucent substrate; a second translucent substrate facing the first translucent substrate; a liquid crystal layer including polymer dispersed liquid crystal sealed between the first translucent substrate and the second translucent substrate; at least one light emitter facing at least one of a side surface of the first translucent substrate or a side surface of the second translucent substrate; and a display controller that controls a color of an image overlapping with a background viewed through the first translucent substrate and the second translucent substrate according to a color of the background.

BRIEF DESCRIPTION OF THE DRAWINGS

FIG. 25 is a diagram for explaining a fifth display example of the embodiment;

DETAILED DESCRIPTION

Figure 1:
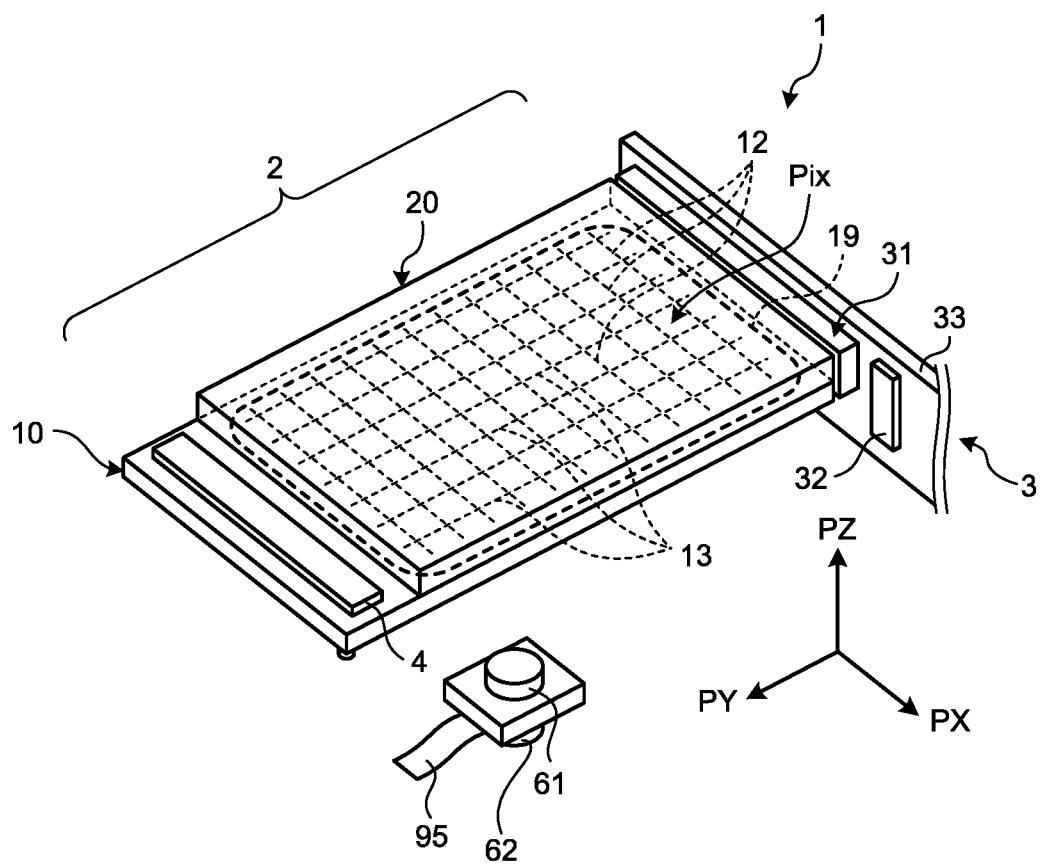
FIG. 1 is a perspective view illustrating an example of a display device according to an embodiment of the present disclosure.

Exemplary aspects (embodiments) according to the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below can be appropriately combined. The disclosure is given by way of example only, and various changes made without departing from the spirit of the disclosure and easily conceivable by those skilled in the art are naturally included in the scope of the invention. The drawings may possibly illustrate the width, the thickness, the shape, and the like of each unit more schematically than the actual aspect to simplify the explanation. These elements, however, are given by way of example only and are not intended to limit interpretation of the disclosure. In the specification and the figures, components similar to those previously described with reference to a preceding figure are denoted by like reference numerals, and detailed explanation thereof will be appropriately omitted. In this disclosure, when an element A is described as being "on" another element B, the element A can be directly on the other element B, or there can be one or more elements between the element A and the other element B.

Figure 2:
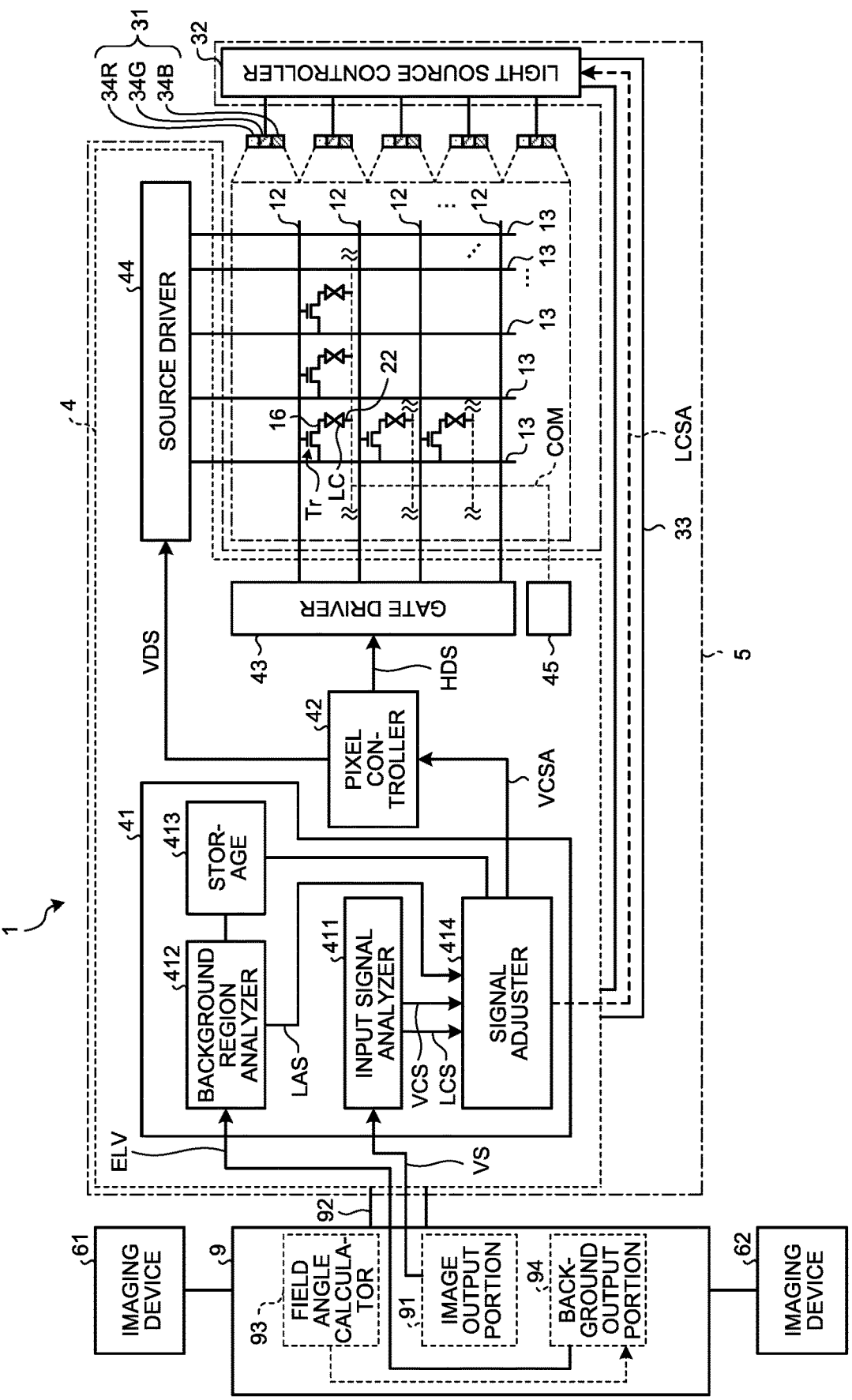
FIG. 2 is a block diagram illustrating the display device of FIG. 1.
Figure 3:
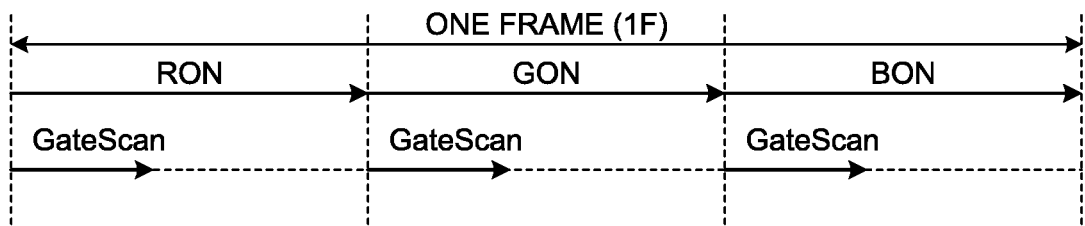
FIG. 3 is a timing chart for explaining timing of light emission by a light source in a field-sequential system.

FIG. 1 is a perspective view illustrating an example of a display device according to an embodiment of the present disclosure. FIG. 2 is a block diagram illustrating the display device of FIG. 1. FIG. 3 is a timing chart for explaining timing of light emission by a light source in a field-sequential system.

As illustrated in FIG. 1, a display device 1 includes at least a display panel 2, a side light source 3, and a drive circuit 4 constituting a part of a display controller 5 (refer to FIG. 2) to be described later. As illustrated in FIG. 2, the display device 1 further includes imaging devices 61 and 62 illustrated in FIG. 1 and a higher-level controller 9. A PX direction denotes one direction of the display panel 2. A PY direction denotes a direction orthogonal to the PX direction. A PZ direction denotes a direction orthogonal to a PX-PY plane.

Figure 5:
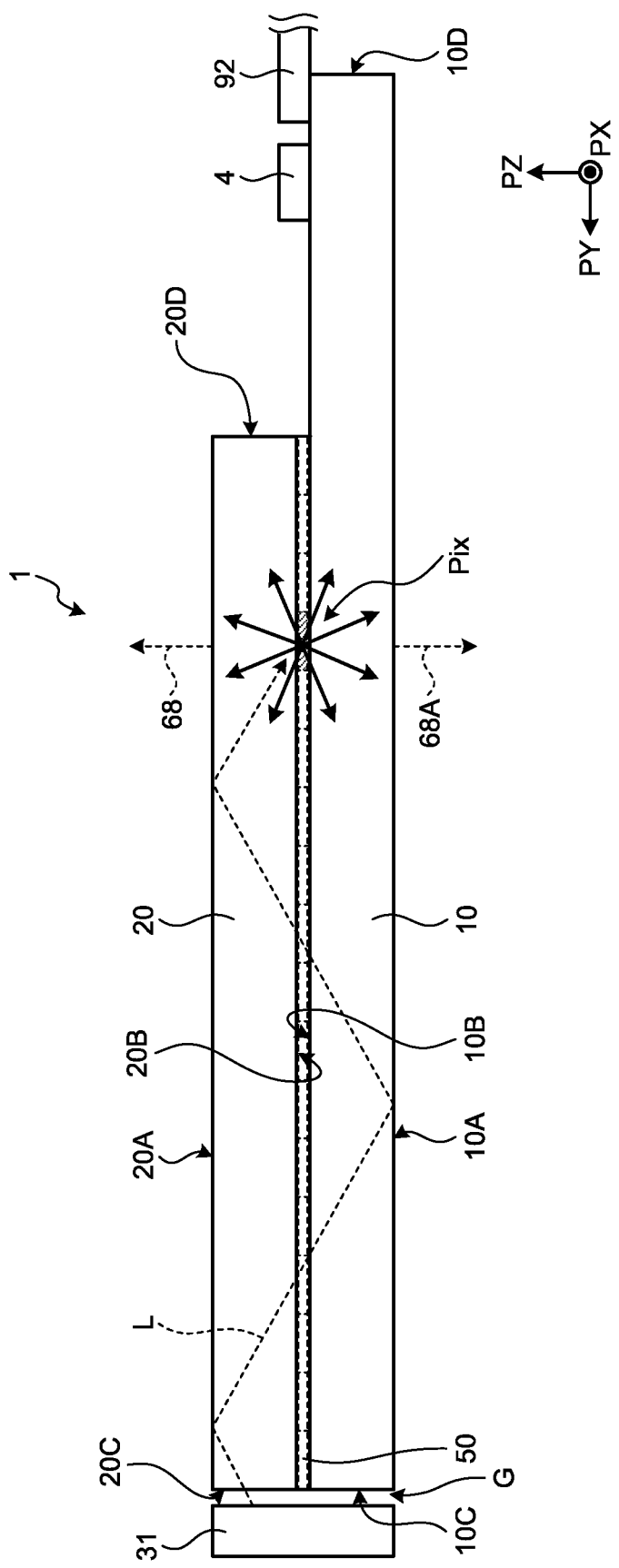
FIG. 5 is a sectional view illustrating an exemplary section of the display device of FIG. 1.

The display panel 2 includes a first translucent substrate 10, a second translucent substrate 20, and a liquid crystal layer 50 (refer to FIG. 5). The second translucent substrate 20 faces a surface of the first translucent substrate 10 in a direction orthogonal to the surface of the first translucent substrate 10 (in the PZ direction in FIG. 1). Polymer dispersed liquid crystal (to be described later) is sealed in the liquid crystal layer 50 (refer to FIG. 5) with the first translucent substrate 10, the second translucent substrate 20, and a sealing part 19.

As illustrated in FIG. 1, the inside of the sealing part 19 in the display panel 2 serves as a display region. A plurality of pixels Pix are arranged in a matrix in the display region. In the present disclosure, a row refers to a pixel row including m pixels Pix arranged in one direction, and a column refers to a pixel column including n pixels Pix arranged in a direction orthogonal to the direction in which the rows are arranged. The values of m and n are determined according to display resolution in the vertical direction and that in the horizontal direction. A plurality of scanning lines 12 are arranged row by row, and a plurality of signal lines 13 are arranged column by column.

The side light source 3 includes a light emitter 31. As illustrated in FIG. 2, a light source controller 32, a light source substrate 33 on which the light emitter 31 and the light source controller 5 are disposed, and the drive circuit 4 constitute the display controller 5. The light source substrate 33 is a flexible substrate, and serves also as wiring for electrically coupling the light source controller 32 to the drive circuit 4 (refer to FIG. 2). The light emitter 31 is electrically coupled to the light source controller 32 through the wiring in the light source substrate 33.

Each of the imaging devices 61 and 62 includes, for example, a complementary metal-oxide-semiconductor (CMOS) image sensor or a charge-coupled device (CCD) image sensor. The imaging device 61 can capture an image in the PZ direction. The imaging device 62 can capture an image in the opposite direction of the direction the imaging device 61 faces.

The imaging device 61 is coupled to the higher-level controller 9 through a flexible substrate 95 illustrated in FIG. 1, and can transmit information on the image captured by the imaging device 61 to the higher-level controller 9. The imaging device 62 is coupled to the higher-level controller 9 through the flexible substrate 95, and can transmit information on the image captured by the imaging device 62 to the higher-level controller 9.

In the present embodiment, the imaging device 61 captures an image on a viewer side, and the imaging device 62 captures an image on a background side. The display panel 2 can be viewed from one side to the other side in the PZ direction, and can also be viewed from the other side to the one side in the PZ direction. In this case, the imaging device 61 captures an image on the background side, and the imaging device 62 captures an image on the viewer side.

The higher-level controller 9 includes, for example, a central processing unit (CPU), a random access memory (RAM), and a read-only memory (ROM). The higher-level controller 9 uses the CPU to implement various functions, such as functions of an image output portion 91, a background output portion 94, and a field angle calculator 93.

In accordance with a video signal supplied from the outside, the higher-level controller 9 supplies an input signal VS for displaying an image on the display panel 2 from the image output portion 91 to the drive circuit 4 through a flexible substrate 92.

The higher-level controller 9 uses the field angle calculator 93 to calculate a field angle based on the position of eyes of the viewer captured by the imaging device 61. The background output portion 94 clips a region having the field angle calculated by the field angle calculator 93 from the background image captured by the imaging device 62, and generates background information. The higher-level controller 9 supplies a signal ELV of the background information from the background output portion 94 to the drive circuit 4 through the flexible substrate 92.

As illustrated in FIG. 1, the drive circuit 4 is fixed to the surface of the first translucent substrate 10. As illustrated in FIG. 2, the drive circuit 4 includes an analyzer 41, a pixel controller 42, a gate driver 43, a source driver 44, and a common potential driver 45. The first translucent substrate 10 has an area larger than that of the second translucent substrate 20 in the PX-PY plane, and the drive circuit 4 is provided on an overhang of the first translucent substrate 10 exposed from the second translucent substrate 20.

The analyzer 41 receives the input signal (e.g., a red-green-blue (RGB) signal) VS and the signal ELV of the information on background regions (hereinafter, called the background information), which have been described above.

The analyzer 41 includes an input signal analyzer 411, a background region analyzer 412, a storage 413, and a signal adjuster 414. The input signal analyzer 411 generates a first pixel input signal VCS and a light source control signal LCS in accordance with the input signal VS supplied from the outside. The light source control signal LCS is a signal including information on a light quantity of the light emitter 31 set according to, for example, input gradation values given to all the pixels Pix. For example, the light quantity of the light emitter 31 is set smaller when a darker image is displayed, and the light quantity of the light emitter 31 is set larger when a brighter image is displayed.

The first pixel input signal VCS is a signal for determining a gradation value to be given to each of the pixels Pix of the display panel 2 in accordance with the input signal VS. In other words, the first pixel input signal VCS is a signal including gradation information on the gradation value of each of the pixels Pix. The pixel controller 42 performs correction processing, such as gamma correction and expansion processing, on each of the input gradation values of the first pixel input signal VCS to set an output gradation value.

The background region analyzer 412 receives the signal ELV of the background information described above. The background region analyzer 412 generates an adjustment signal LAS according to the position of an image stored in the storage 413 and the signal ELV of the background information. The background region analyzer 412 partitions a processing region corresponding to the position of the image, and calculates an average gradation of the background in the partitioned processing range. The adjustment signal LAS includes the average gradation of the background in the processing range.

The signal adjuster 414 generates a light source control signal LCSA directly from the light source control signal LCS without adjusting the light source control signal LCS by the adjustment signal LAS, and transmits the light source control signal LCSA to the light source controller 32. The signal adjuster 414 generates a second pixel input signal VCSA from the first pixel input signal VCS in accordance with the adjustment signal LAS, and transmits the second pixel input signal VCSA to the pixel controller 42. The second pixel input signal VCSA will be described later.

The pixel controller 42 generates a horizontal drive signal HDS and a vertical drive signal VDS in accordance with the second pixel input signal VCSA. In the present embodiment, since the display device 1 is driven by the field-sequential system, the horizontal drive signal HDS and the vertical drive signal VDS are generated for each color that can be emitted by the light emitter 31.

The gate driver 43 sequentially selects the scanning lines 12 of the display panel 2 in accordance with the horizontal drive signal HDS during one vertical scanning period. The scanning lines 12 can be selected in any order.

The source driver 44 supplies a gradation signal according to the output gradation value of each of the pixels Pix to corresponding one of the signal lines 13 of the display panel 2, in accordance with the vertical drive signal VDS, during one horizontal scanning period.

In the present embodiment, the display panel 2 is an active-matrix panel. Hence, the display panel 2 includes the signal (source) lines 13 extending in the PX direction and the scanning (gate) lines 12 extending in the PY direction in a plan view, and includes switching elements Tr at intersections between the respective signal lines 13 and the respective scanning lines 12.

A thin-film transistor is used for each switching element Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to each of the signal lines 13, and the gate electrode of the switching element Tr is coupled to each of the scanning lines 12. The other of the source electrode and the drain electrode is coupled to one end of a liquid crystal capacitor LC. The liquid crystal capacitor LC is coupled at one end thereof to the switching element Tr through a pixel electrode 16, and coupled at the other end thereof to a common potential COM through a common electrode 22. The common potential COM is supplied from the common potential driver 45.

The light emitter 31 includes a light emitter 34R of a first color (e.g., red), a light emitter 34G of a second color (e.g., green), and a light emitter 34B of a third color (e.g., blue). The light source controller 32 controls the light emitter 34R of the first color to emit light, the light emitter 34G of the second color to emit light, and the light emitter 34B of the third color to emit light in a time-division manner, in accordance with the light source control signal LCSA. In this manner, the light emitter 34R of the first color, the light emitter 34G of the second color, and the light emitter 34B of the third color are driven by the field-sequential system.

As illustrated in FIG. 3, during a first sub-frame (first predetermined time) RON, the light emitter 34R of the first color emits light, and some of the pixels Pix selected during one vertical scanning period GateScan scatter light to perform display. At this time, on the entire display panel 2, if the above-described gradation signal according to the output gradation value of each of the pixels Pix selected during this vertical scanning period GateScan is supplied to corresponding one of the signal lines 13, only the first color is lit up.

Then, during a second sub-frame (second predetermined time) GON, the light emitter 34G of the second color emits light, and some of the pixels Pix selected during one vertical scanning period GateScan scatter light to perform display. At this time, on the entire display panel 2, if the above-described gradation signal according to the output gradation value of each of the pixels Pix selected during this vertical scanning period GateScan is supplied to corresponding one of the signal lines 13, only the second color is lit up.

Further, during a third sub-frame (third predetermined time) BON, the light emitter 34B of the third color emits light, and some of the pixels Pix selected during one vertical scanning period GateScan scatter light to perform display. At this time, on the entire display panel 2, if the above-described gradation signal according to the output gradation value of each of the pixels Pix selected during this vertical scanning period GateScan is supplied to corresponding one of the signal lines 13, only the third color is lit up.

The eyes of a human have a limited temporal resolution, and see an afterimage. Thus, the eyes of a human recognize a synthesized image of three colors in one-frame period (1F). The field-sequential system can eliminate the need for a color filter, and thus can suppress an absorption loss by the color filter. As a result, higher transmittance can be obtained. In the color filter system, the pixel Pix is divided into sub-pixels of the first color, the second color, and the third color, so that the sub-pixels constitute one pixel Pix. In contrast, in the field-sequential system, since the pixel need not be divided into the sub-pixels in such a manner, the resolution can be easily increased.

Figure 4:
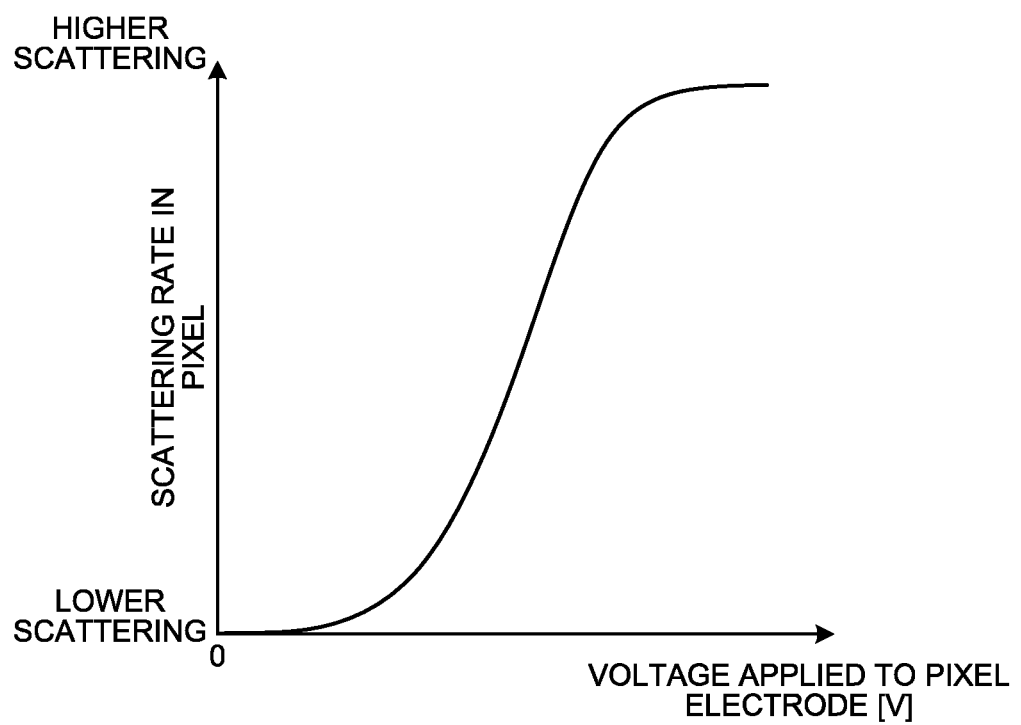
FIG. 4 is a graph illustrating a relation between a voltage applied to a pixel electrode and a scattering state of a pixel.
Figure 6:
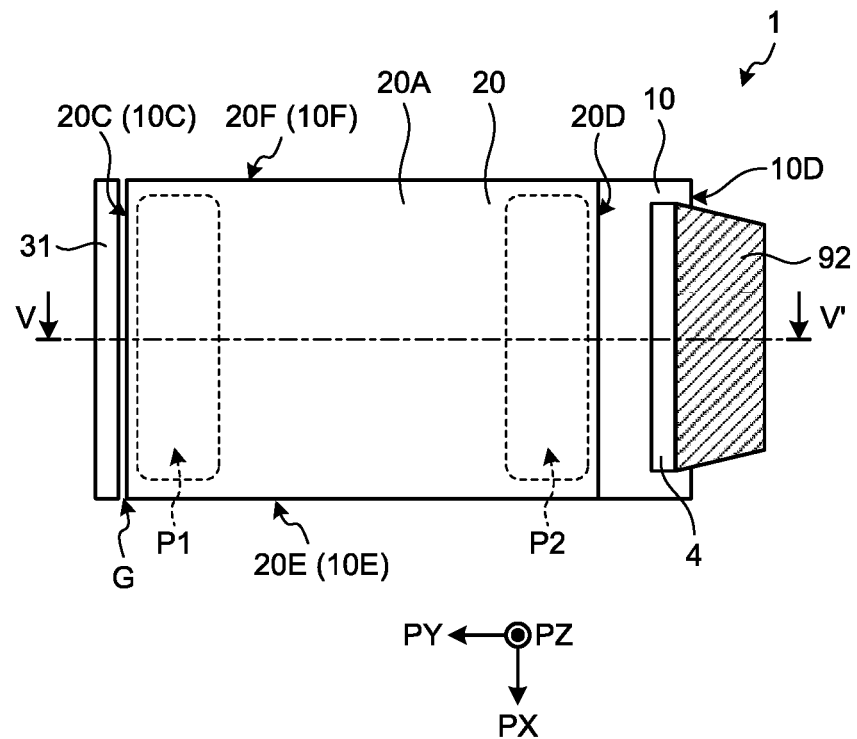
FIG. 6 is a plan view illustrating a plane of the display device of FIG. 1.
Figure 7:
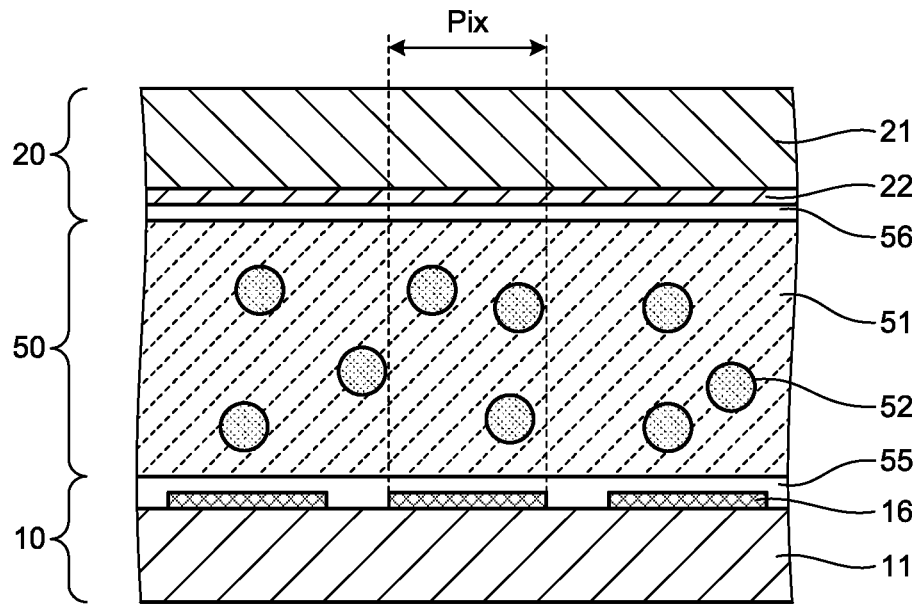
FIG. 7 is an enlarged sectional view obtained by enlarging a liquid crystal layer of FIG. 5.
Figure 8:
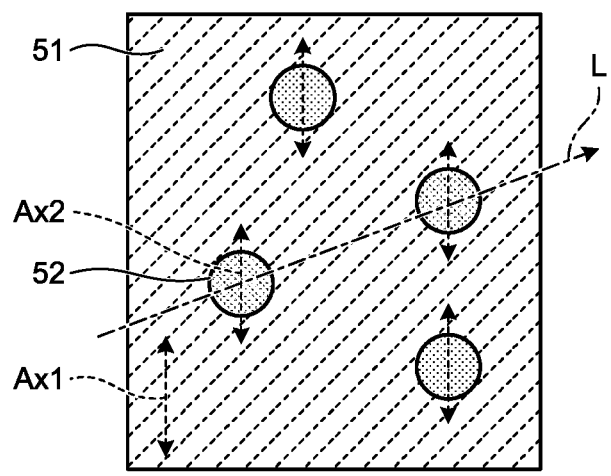
FIG. 8 is a sectional view for explaining a non-scattering state in the liquid crystal layer.
Figure 9:
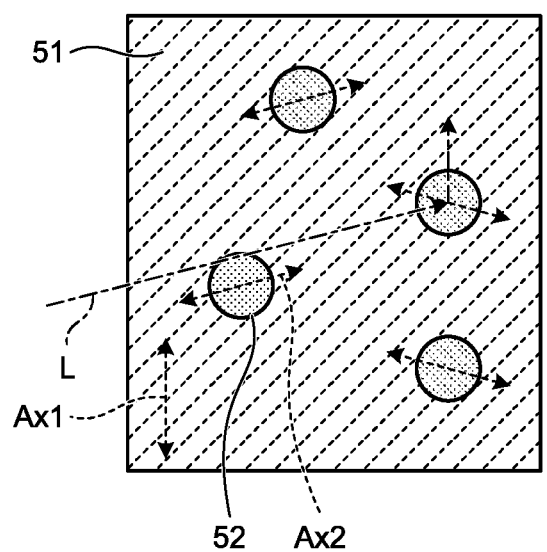
FIG. 9 is a sectional view for explaining the scattering state in the liquid crystal layer.

FIG. 4 is a graph illustrating a relation between a voltage applied to the pixel electrode and a scattering state of the pixel. FIG. 5 is a sectional view illustrating an exemplary section of the display device of FIG. 1. FIG. 6 is a plan view illustrating a plane of the display device of FIG. 1. FIG. 5 illustrates a V-V' section of FIG. 6. FIG. 7 is an enlarged sectional view obtained by enlarging the liquid crystal layer of FIG. 5. FIG. 8 is a sectional view for explaining a non-scattering state in the liquid crystal layer. FIG. 9 is a sectional view for explaining the scattering state in the liquid crystal layer.

If the above-described gradation signal according to the output gradation value of each of the pixels Pix selected during one vertical scanning period GateScan is supplied to corresponding one of the signal lines 13, the voltage applied to the pixel electrode 16 changes with the gradation signal. The change in the voltage applied to the pixel electrode 16 changes the voltage between the pixel electrode 16 and the common electrode 22. The scattering state of the liquid crystal layer 50 for each of the pixels Pix is controlled according to the voltage applied to the pixel electrode 16, and the scattering rate in the pixel Pix changes, as illustrated in FIG. 4. In this manner, the display controller 5 sequentially applies a voltage to a first electrode according to the gradation values of the first color, the second color, and the third color included in the second pixel input signal VCSA in synchronization with the emission of the light of the first color, the light of the second color, or the light of the third color described above. Thus, the display device 1 displays the image.

As illustrated in FIGS. 5 and 6, the first translucent substrate 10 has a first principal surface 10A, a second principal surface 10B, a first side surface 10C, a second side surface 10D, a third side surface 10E, and a fourth side surface 10F. The first principal surface 10A and the second principal surface 10B are parallel to each other. The first side surface 10C and the second side surface 10D are parallel to each other. The third side surface 10E and the fourth side surface 10F are parallel to each other.

As illustrated in FIGS. 5 and 6, the second translucent substrate 20 has a first principal surface 20A, a second principal surface 20B, a first side surface 20C, a second side surface 20D, a third side surface 20E, and a fourth side surface 20F. The first principal surface 20A and the second principal surface 20B are parallel to each other. The first side surface 20C and the second side surface 20D are parallel to each other. The third side surface 20E and the fourth side surface 20F are parallel to each other.

As illustrated in FIGS. 5 and 6, the light emitter 31 faces the first side surface 20C of the second translucent substrate 20. As illustrated in FIG. 5, the light emitter 31 emits light-source light L to the first side surface 20C of the second translucent substrate 20. The first side surface 20C of the second translucent substrate 20 facing the light emitter 31 serves as a light incident surface. A gap G is provided between the light emitter 31 and the light incident surface. The gap G serves as an air layer.

As illustrated in FIG. 5, the light-source light L emitted from the light emitter 31 propagates in a direction away from the first side surface 20C while being reflected by the first principal surface 10A of the first translucent substrate 10 and the first principal surface 20A of the second translucent substrate 20. When the light-source light L travels from the first principal surface 10A of the first translucent substrate 10 or the first principal surface 20A of the second translucent substrate 20 toward the outside, the light-source light L travels from a medium from a higher refractive index to a medium having a lower refractive index. Hence, if the incident angle of the light-source light L incident on the first principal surface 10A of the first translucent substrate 10 or the first principal surface 20A of the second translucent substrate 20 is larger than a critical angle, the light-source light L is fully reflected by the first principal surface 10A of the first translucent substrate 10 or the first principal surface 20A of the second translucent substrate 20.

As illustrated in FIG. 5, the light-source light L that has propagated in the first translucent substrate 10 and the second translucent substrate 20 is scattered by any of the pixels Pix including liquid crystal in the scattering state, and the incident angle of the scattered light becomes an angle smaller than the critical angle. Thus, emission light 68 or 68A is emitted to the outside from the first principal surface 10A of the first translucent substrate 10 or the first principal surface 20A of the second translucent substrate 20. The emission light 68 or 68A emitted to the outside from the first principal surface 10A of the first translucent substrate 10 or the first principal surface 20A of the second translucent substrate 20 is viewed by the viewer. In the present disclosure, a value representing a luminance level of the emission light 68 or the emission light 68A in the pixel Pix is called an emission luminance gradation value. The following describes the polymer dispersed liquid crystal in the scattering state and the polymer dispersed liquid crystal in the non-scattering state, using FIGS. 7 to 9.

As illustrated in FIG. 7, the first translucent substrate 10 is provided with a first orientation film 55, and the second translucent substrate 20 is provided with a second orientation film 56. The first and the second orientation films 55 and 56 are vertical orientation films, for example.

A solution obtained by dispersing liquid crystal molecules in monomers is sealed between the first translucent substrate 10 and the second translucent substrate 20. Subsequently, in a state where the monomers and the liquid crystal molecules are oriented by the first and the second orientation films 55 and 56, the monomers are polymerized by ultraviolet rays or heat to form a bulk 51. This process forms the liquid crystal layer 50 including the reverse-mode polymer dispersed liquid crystal in which the liquid crystal is dispersed in gaps of a polymer network formed in a mesh manner.

In this way, the liquid crystal layer 50 includes the bulk 51 formed of the polymer and a plurality of fine particles 52 dispersed in the bulk 51. The fine particles 52 include the liquid crystal molecules. Both the bulk 51 and the fine particles 52 have optical anisotropy.

The orientation of the liquid crystal molecules included in the fine particles 52 is controlled by a voltage difference between the pixel electrode 16 and the common electrode 22. The orientation of the liquid crystal molecules is changed by the voltage applied to the pixel electrode 16. The degree of scattering of light passing through the pixel Pix changes in accordance with the change of the orientation of the liquid crystal molecules.

For example, as illustrated in FIG. 8, the direction of an optical axis Ax1 of the bulk 51 is the same as the direction of an optical axis Ax2 of the fine particles 52 when no voltage is applied between the pixel electrode 16 and the common electrode 22. The optical axis Ax2 of the fine particles 52 is parallel to the PZ direction of the liquid crystal layer 50. The optical axis Ax1 of the bulk 51 is parallel to the PZ direction of the liquid crystal layer 50 regardless of whether the voltage is applied.

An ordinary-ray refractive index of the bulk 51 and that of the fine particles 52 are equal to each other. When no voltage is applied between the pixel electrode 16 and the common electrode 22, the difference in refractive index between the bulk 51 and the fine particles 52 is zero in all directions. The liquid crystal layer 50 is placed in the non-scattering state of not scattering the light-source light L. The light-source light L propagates in a direction away from the light emitter 31 while being reflected by the first principal surface 10A of the first translucent substrate 10 and the first principal surface 20A of the second translucent substrate 20. When the liquid crystal layer 50 is in the non-scattering state of not scattering the light-source light L, a background on the first principal surface 20A side of the second translucent substrate 20 is visible from the first principal surface 10A of the first translucent substrate 10, and a background on the first principal surface 10A side of the first translucent substrate 10 is visible from the first principal surface 20A of the second translucent substrate 20.

As illustrated in FIG. 9, the optical axis Ax2 of the fine particle 52 is inclined by an electric field formed between the pixel electrode 16 and the common electrode 22 to which a voltage is applied. Since the optical axis Ax1 of the bulk 51 is not changed by the electric field, the direction of the optical axis Ax1 of the bulk 51 differs from the direction of the optical axis Ax2 of the fine particles 52. The light-source light L is scattered in the pixel Pix including the pixel electrode 16 to which a voltage is applied. As described above, the viewer views a part of the scattered light-source light L emitted outward from the first principal surface 10A of the first translucent substrate 10 or the first principal surface 20A of the second translucent substrate 20.

In the pixel Pix including the pixel electrode 16 to which no voltage is applied, the background on the first principal surface 20A side of the second translucent substrate 20 is visible from the first principal surface 10A of the first translucent substrate 10, and the background on the first principal surface 10A side of the first translucent substrate 10 is visible from the first principal surface 20A of the second translucent substrate 20. In the display device 1 of the present embodiment, when the input signal VS is input from the image output portion 91, the voltage is applied to the pixel electrode 16 of the pixel Pix to display an image, and the image in accordance with the second pixel input signal VCSA becomes visible together with the background.

The light-source light L is scattered in the pixel Pix including the pixel electrode 16 to which a voltage is applied, and emitted outward, so that an image is superimposed on the background to be displayed. In other words, the display device 1 of the present embodiment superimposes the image on the background by combining the emission light 68 and the emission light 68A with the background to display the image.

Figure 10:
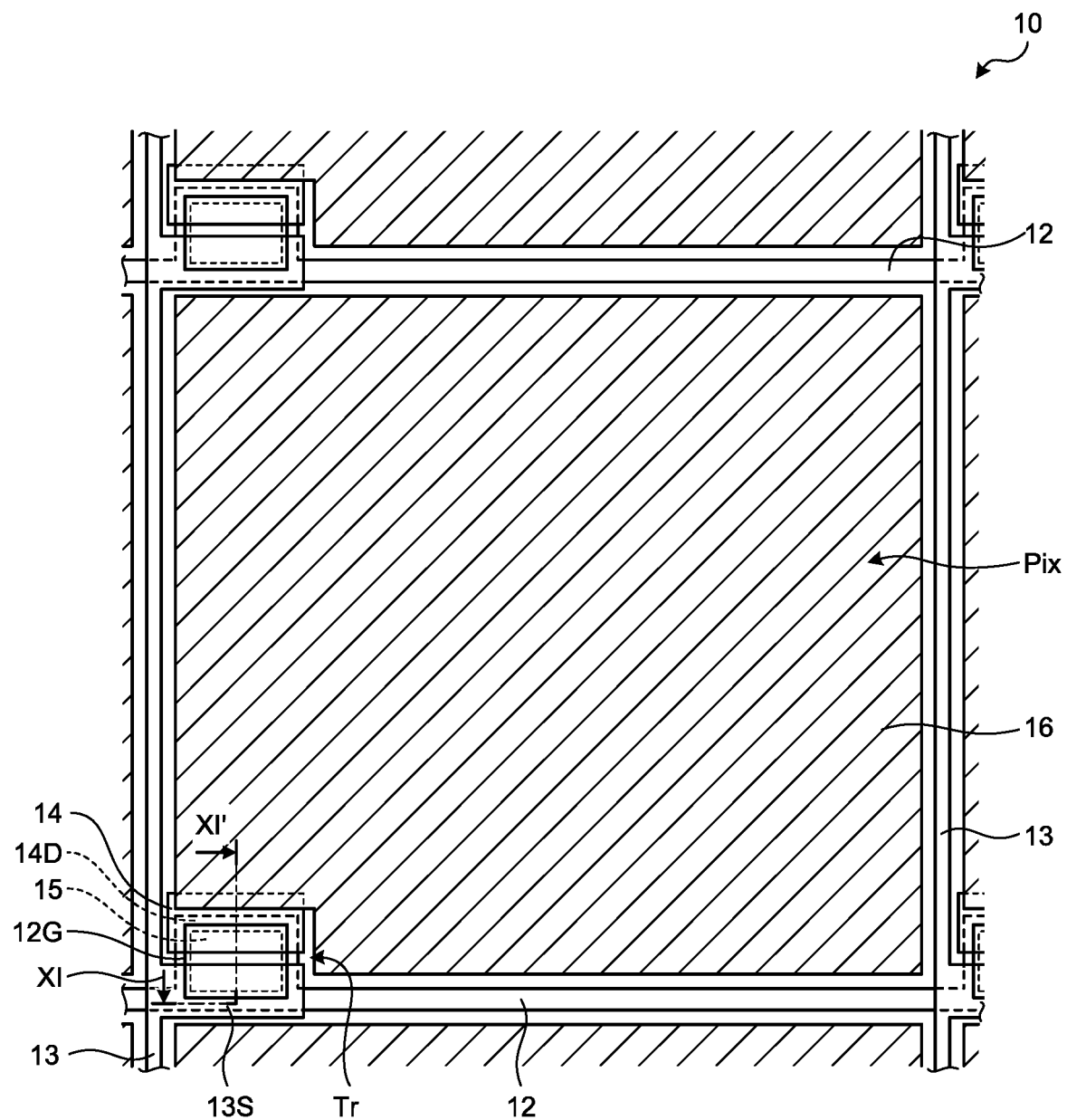
FIG. 10 is a plan view illustrating the pixel.
Figure 11:
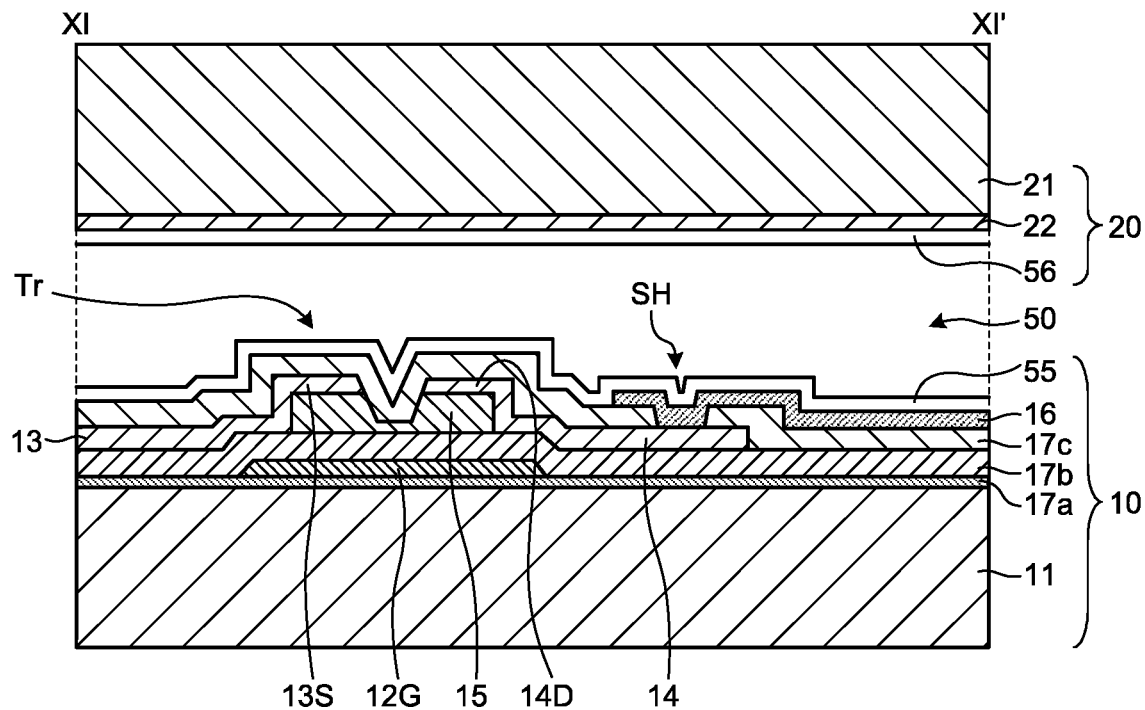
FIG. 11 is a sectional view along XI-XI' in FIG. 10.

FIG. 10 is a plan view illustrating the pixel. FIG. 11 is a sectional view along XI-XI' in FIG. 10. As illustrated in FIGS. 1, 2, and 10, the first translucent substrate 10 is provided with the signal lines 13 and the scanning lines 12 so as to form a grid in the plan view. A region surrounded by the adjacent scanning lines 12 and the adjacent signal lines 13 corresponds to the pixel Pix. The pixel Pix is provided with the pixel electrode 16 and the switching element Tr. In the present embodiment, the switching element Tr is a bottom-gate thin film transistor. The switching element Tr includes a semiconductor layer 15 overlapping, in the plan view, with a gate electrode 12G electrically coupled to corresponding one of the scanning lines 12.

The scanning lines 12 are wiring of a metal such as molybdenum (Mo) and aluminum (Al), a laminated body of these metals, or an alloy thereof. The signal lines 13 are wiring of a metal, such as aluminum, or an alloy thereof.

The semiconductor layer 15 is provided not to protrude from the gate electrode 12G in the plan view. As a result, the light-source light L traveling from the gate electrode 12G toward the semiconductor layer 15 is reflected, thereby suppressing light leakage in the semiconductor layer 15.

As illustrated in FIG. 10, a source electrode 13S electrically coupled to corresponding one of the signal lines 13 overlaps with one end portion of the semiconductor layer 15 in the plan view.

As illustrated in FIG. 10, a drain electrode 14D is arranged in juxtaposition with the source electrode 13S across a central portion of the semiconductor layer 15 in the plan view. The drain electrode 14D overlaps with the other end portion of the semiconductor layer 15 in the plan view. A portion overlapping with neither the source electrode 13S nor the drain electrode 14D serves as a channel of the switching element Tr. As illustrated in FIG. 11, conductive wiring 14 coupled to the drain electrode 14D is electrically coupled to the pixel electrode 16 at a through-hole SH.

As illustrated in FIG. 11, the first translucent substrate 10 includes a first base material 11 made of, for example, glass. The first base material 11 may be made of a resin, such as polyethylene terephthalate, as long as having translucency. A first insulating layer 17a is provided on the first base material 11, and the scanning line 12 and the gate electrode 12G are provided on the first insulating layer 17a. A second insulating layer 17b covers the scanning line 12. The first insulating layer 17a and the second insulating layer 17b are made of, for example, a transparent inorganic insulating member, such as a silicon nitride member.

The semiconductor layer 15 is stacked on the second insulating layer 17b. The semiconductor layer 15 is made of, for example, amorphous silicon, but may be made of polysilicon or an oxide semiconductor.

The source electrode 13S and the signal line 13 partially covering the semiconductor layer 15, the drain electrode 14D partially covering the semiconductor layer 15, and the conductive wiring 14 are provided on the second insulating layer 17b. The drain electrode 14D is made of the same material as that of the signal line 13. A third insulating layer 17c is provided on the semiconductor layer 15, the signal lines 13, and the drain electrode 14D. The third insulating layer 17c is made of, for example, a transparent inorganic insulating member, such as a silicon nitride member.

The pixel electrode 16 is provided on the third insulating layer 17c. The pixel electrode 16 is made of a translucent conductive member, such as an indium tin oxide (ITO) member. The pixel electrode 16 is electrically coupled to the conductive wiring 14 and the drain electrode 14D through contact holes in the third insulating layer 17c. The first orientation film 55 is provided on the pixel electrode 16.

The second translucent substrate 20 includes a second base material 21 made of, for example, glass. The second base material 21 may be made of a resin, such as polyethylene terephthalate, as long as having translucency. The second base material 21 is provided with the common electrode 22. The common electrode 22 is made of a translucent conductive member, such as an ITO member. The second orientation film 56 is provided on a surface of the common electrode 22.

Figure 12:
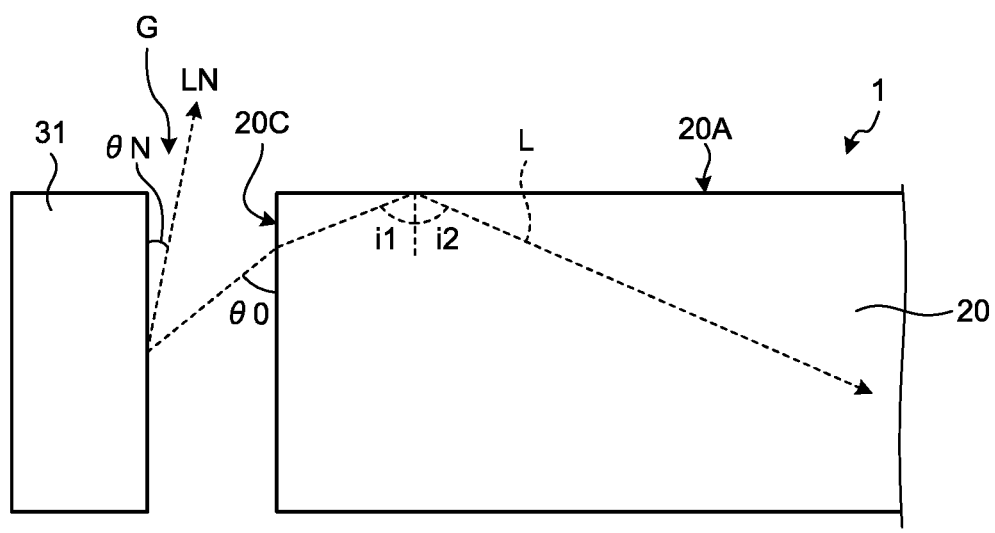
FIG. 12 is a diagram for explaining incident light from a light emitter.

FIG. 12 is a diagram for explaining the incident light from the light emitter. The light from the light emitter 31 is incident on the first side surface 20C of the second translucent substrate 20 at an angle θ0, and then is incident on the first principal surface 20A of the second translucent substrate 20 at an angle i1. If the angle i1 is larger than the critical angle, the light-source light L is fully reflected at an angle i2 by the first principal surface 20A of the second translucent substrate 20, and propagates in the second translucent substrate 20. Since the gap G is provided between the light emitter 31 and the first side surface 20C (light incident surface) as illustrated in FIG. 12, light-source light LN at an angle θN that reduces the angle i1 to below the critical angle is not guided to the first side surface 20C of the second translucent substrate 20.

Figure 13:
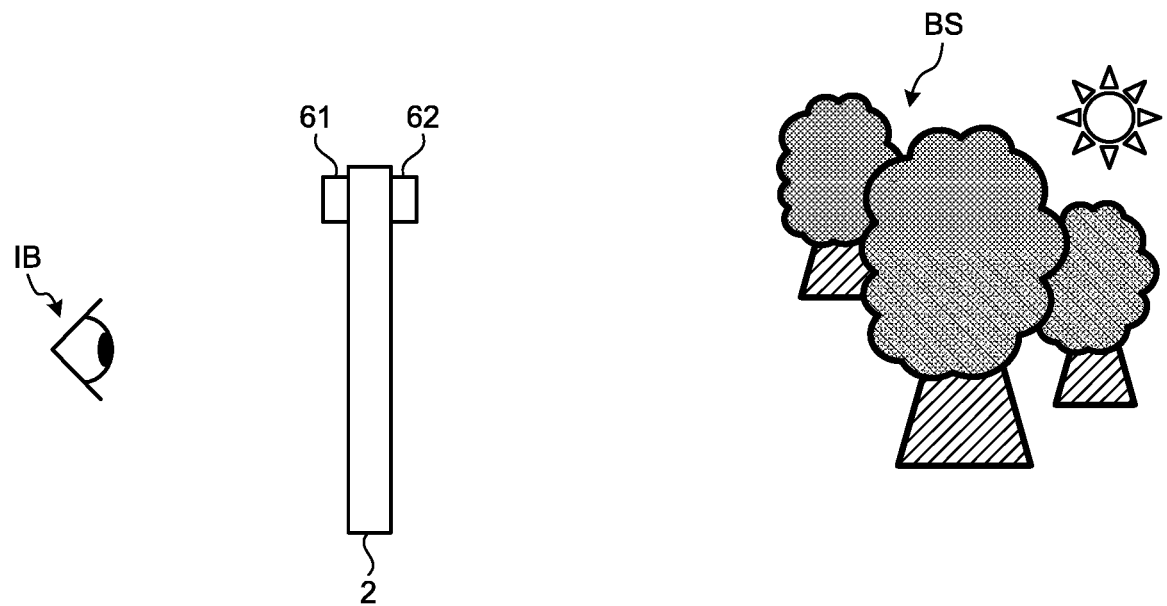
FIG. 13 is a diagram for explaining an interrelation among a viewer, a display panel, and a background.
Figure 14:
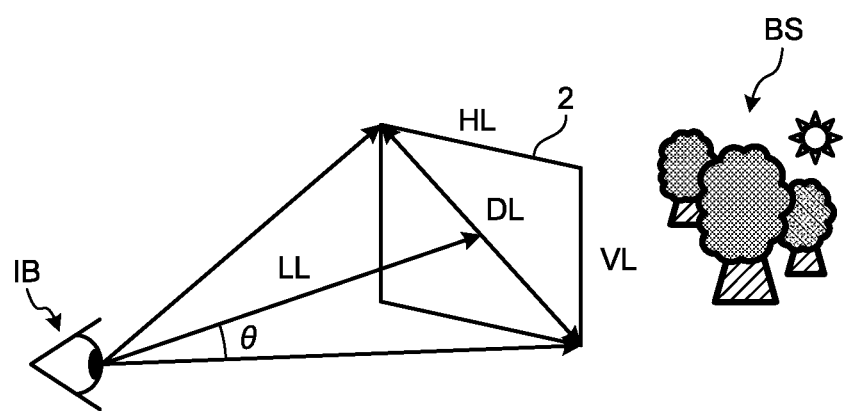
FIG. 14 is a diagram for explaining a field angle of the display panel.

FIG. 13 is a diagram for explaining an interrelation among the viewer, the display panel, and the background. FIG. 14 is a diagram for explaining the field angle of the display panel. As illustrated in FIG. 13, the viewer views a background BS through the display panel 2 at an eye position IB. The imaging device 61 captures the image at the eye position IB of the viewer, and the imaging device 62 captures the image on the background side.

As illustrated in FIG. 14, the field angle according to the present embodiment refers to a range of the background BS that is visible by the viewer at the eye position IB away from the display panel 2 by a distance LL through the display panel 2 in an overlapping manner with the display panel 2. The field angle represents an apparent size of the display region inside the sealing part 19 illustrated in FIG. 1 when viewed from the viewer away at the distance LL. The field angle can be defined as an angle θ determined by information on a horizontal field angular length HL, a vertical field angular length VL, and a diagonal length DL illustrated in FIG. 14, and information on the distance LL described above.

Figure 15:
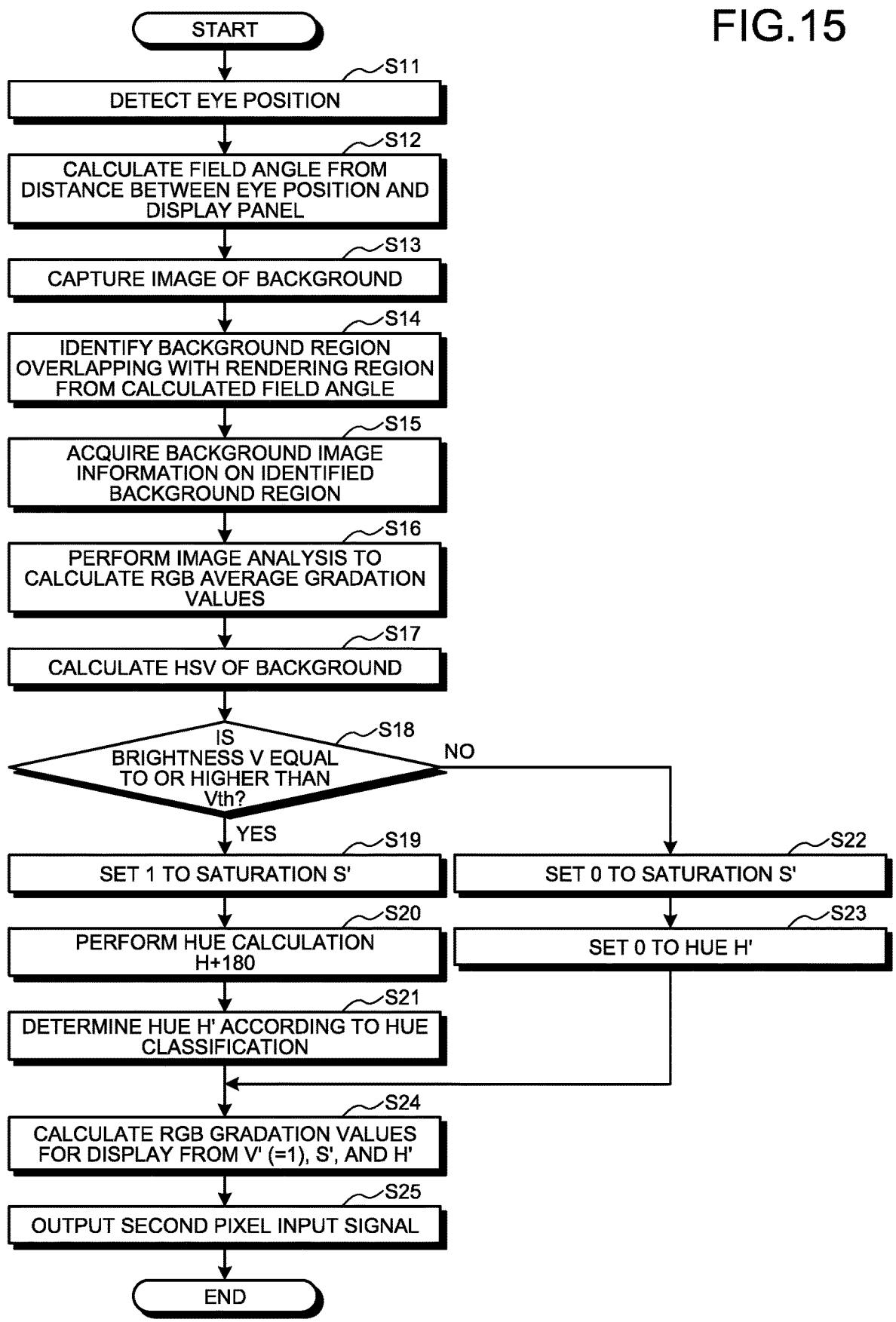
FIG. 15 is a flowchart for explaining a color conversion method of the embodiment.
Figure 16:
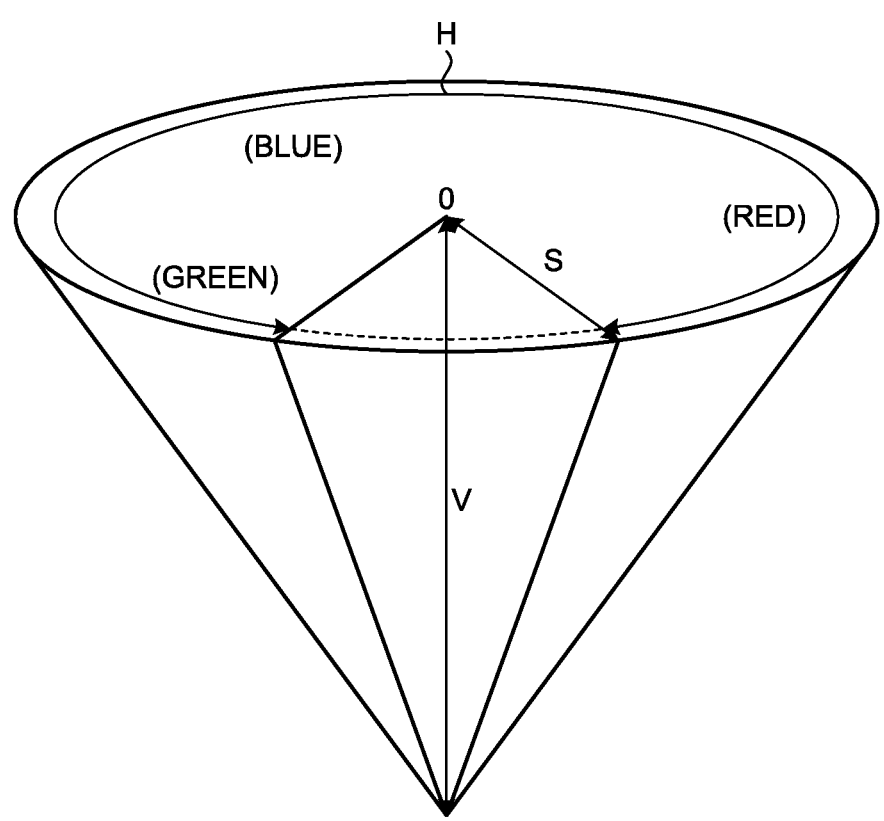
FIG. 16 is a conceptual diagram illustrating an extended HSV color space reproducible by the display device of the embodiment.
Figure 17:
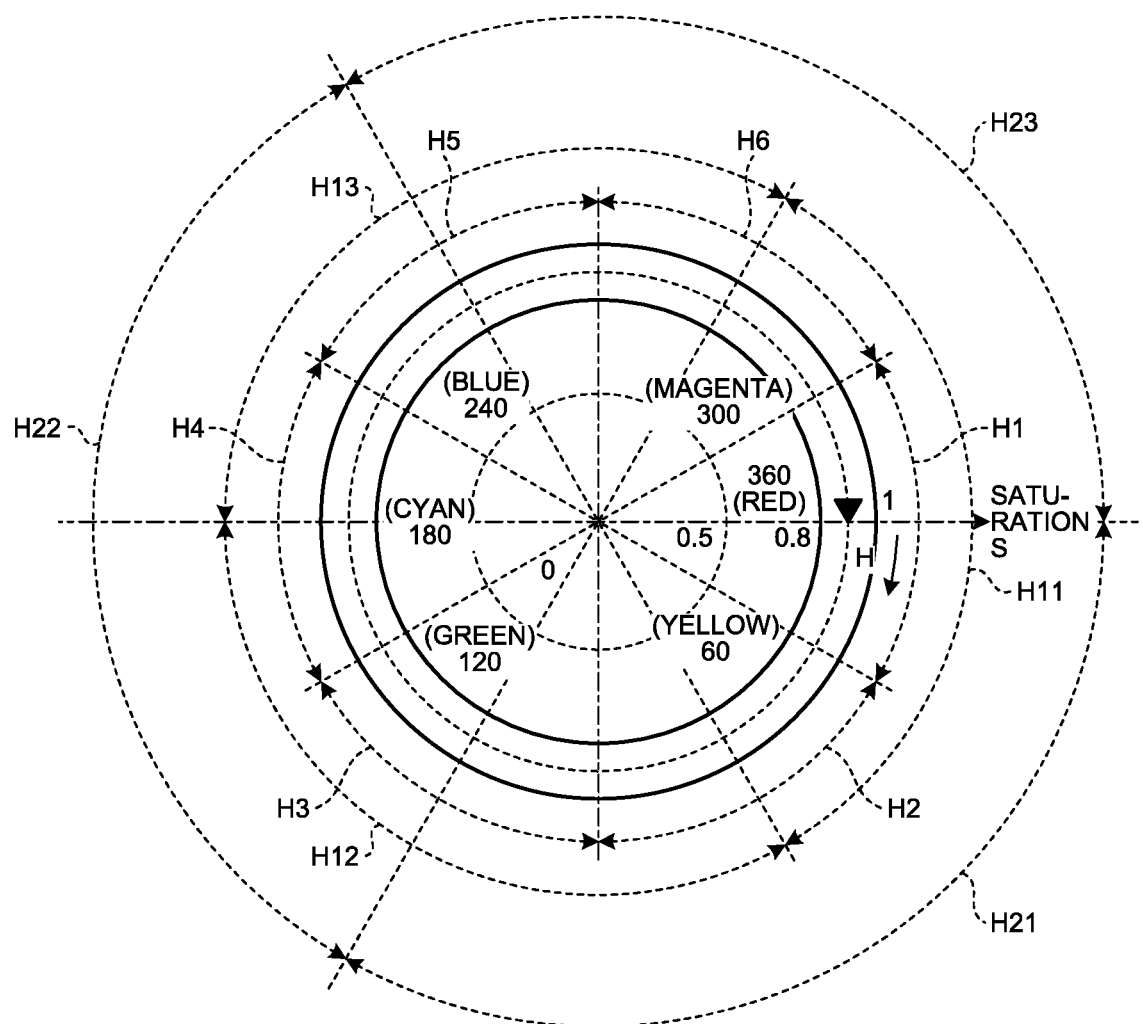
FIG. 17 is a conceptual diagram illustrating a relation between a hue and saturation in the extended HSV color space.
Figures 18, 19:
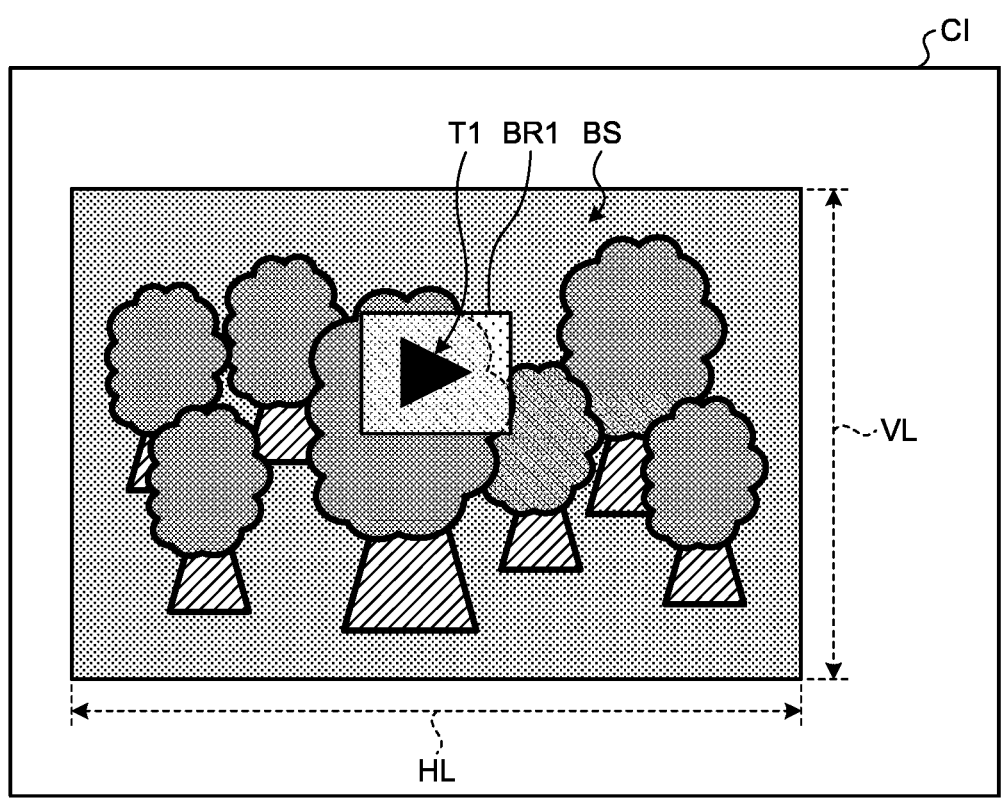
FIG. 18 is a diagram for explaining a plurality of background regions obtained by dividing a display region.
FIG. 19 is a diagram for explaining a first display example of the embodiment.

FIG. 15 is a flowchart for explaining a color conversion method of the present embodiment. FIG. 16 is a conceptual diagram illustrating an extended HSV (Hue-Saturation-Value, Value is also called Brightness) color space reproducible by the display device of the present embodiment. FIG. 17 is a conceptual diagram illustrating a relation between a hue and saturation in the extended HSV color space. FIG. 18 is a diagram for explaining a plurality of background regions obtained by dividing the display region. FIG. 19 is a diagram for explaining a first display example of the present embodiment. The following describes the color conversion method of the present embodiment using the first display example, with reference to FIGS. 1, 2, 13, and 14 to 19, where appropriate.

First Display Example

As illustrated in FIG. 15, in the display device 1, the imaging device 61 captures an image of the viewer, and the field angle calculator 93 illustrated in FIG. 2 detects the eye position IB illustrated in FIGS. 13 and 14 from the captured image (Step S11).

Subsequently, the field angle calculator 93 calculates the distance LL between the eye position IB and the display panel 2. The distance LL can be calculated, for example, from the distance between the eyes of the viewer. The field angle calculator 93 uses the information on the horizontal field angular length HL, the vertical field angular length VL, and the diagonal length DL illustrated in FIG. 14, and the information on the distance LL described above to calculate the angle θ determined by Expressions (1) and (2) below as the field angle (Step S12).

$$DL = \sqrt{(HL^2 + VL^2)} \quad (1)$$

$$\theta = \tan^{-1}\left(\left(\frac{DL}{2}\right)/LL\right) \quad (2)$$

Subsequently, the display device 1 uses the imaging device 62 to capture an image of the background BS (Step S13). As illustrated in FIG. 19, a captured region CI captured by the imaging device 62 has an area larger than that obtained by multiplying the horizontal field angular length HL by the vertical field angular length VL described above.

The background output portion 94 clips the region having the field angle calculated by the field angle calculator 93 from the background image of the background BS captured by the imaging device 62, and generates the background information. The background information includes, for example, the information on the background BS within the display region having the field angle in the first display example illustrated in FIG. 19.

The background region analyzer 412 divides the display region into P×Q processing regions, i.e., processing regions A11, A12, A13, A14, A21, A22, A23, A24, A31, A32, A33, A34, A41, A42, A43, A44, A51, A52, A53, and A54, as illustrated in FIG. 18. In the first display example, the rendering region of an image T1 illustrated in FIG. 19 corresponds to the processing region A32 illustrated in FIG. 18. The background region analyzer 412 thus identifies a background region BR1 overlapping with the processing region A32. In this manner, the background region analyzer 412 identifies the background region BR1 overlapping with the rendering region of the image T1 from the calculated field angle (Step S14).

The background region analyzer 412 acquires background image information on the identified background region BR1 from the signal ELV of the background information (Step S15). The background region analyzer 412 analyzes the image information on the background region BR1 to calculate RGB average gradation values of the background region BR1 (Step S16).

For example, in the first display example, the average gradation values of the RGB signal [R, G, B] for the background region BR1 illustrated in FIG. 19 are [57, 85, 61].

The signal adjuster 414 acquires the RGB average gradation values for the background region BR1 from the signal ELV of the background information. The signal adjuster 414 converts the acquired RGB average gradation values for the background region BR1 into the hue, the saturation, and the brightness in the HSV space illustrated in FIG. 16 to calculate the HSV of the background (Step S17).

For example, if the average gradation values of the RGB signal [R, G, B] for the background region BR1 are [57, 85, 61], the values of the HSV [H, S, V] are [129, 0.1, 0.3].

The display panel 2 has a difficulty to display black. Therefore, the display panel 2 displays the image in white if the background is dark with low brightness. The display panel 2 displays the image as an image having high saturation if the background is bright with high brightness. This processing allows the viewer to easily view the image. Thus, if the brightness is equal to or higher than a predetermined threshold Vth (e.g., 0.5) (Yes at Step S18), the signal adjuster 414 sets 1 to saturation S' after the conversion (Step S19).

After increasing the saturation at Step S19, the signal adjuster 414 calculates the hue (Step S20). Specifically, the signal adjuster 414 performs a hue calculation by adding 180 to a hue H obtained at Step S17 to obtain a hue of a color complementary to that having the hue obtained at Step S17.

The signal adjuster 414 determines a hue H' after the conversion according to one of hue classifications illustrated in FIG. 17 stored in the storage 413 (Step S21).

FIG. 17 illustrates three types of hue classifications. The storage 413 only needs to store in advance any one of a first hue classification, a second hue classification, and a third hue classification. The first, the second, and the third hue classifications may be stored as functions, or may be stored as look-up tables. Although the present embodiment exemplifies the first, the second, and the third hue classifications, the hue may be classified by a nine-division hue classification or a two-division hue classification. In this manner, the number of divisions of the hue classification is not limited to those exemplified in the present embodiment. The signal adjuster 414 determines the complementary color based on one of the first, the second, and the third hue classifications.

According to the first hue classification, the hue of the complementary color obtained at Step S19 is identified as any one of hue ranges H1, H2, H3, H4, H5, and H6 illustrated in FIG. 17. If the hue range H1 is identified, H' after the conversion represents primary red. If the hue range H2 is identified, H' after the conversion represents primary yellow. If the hue range H3 is identified, H' after the conversion represents primary green. If the hue range H4 is identified, H' after the conversion represents cyan. If the hue range H5 is identified, H' after the conversion represents primary blue. If the hue range H6 is identified, H' after the conversion represents magenta.

According to the second hue classification, the hue of the complementary color obtained at Step S19 is identified as any one of hue ranges H11, H12, and H13 illustrated in FIG.

17. If the hue range H11 is identified, H' after the conversion represents primary red. If the hue range H12 is identified, H' after the conversion represents primary green. If the hue range H13 is identified, H' after the conversion represents primary blue.

According to the third hue classification, the hue of the complementary color obtained at Step S19 is identified as any one of hue ranges H21, H22, and H23 illustrated in FIG. 17. If the hue range H21 is identified, H' after the conversion represents primary yellow. If the hue range H22 is identified, H' after the conversion represents cyan. If the hue range H23 is identified, H' after the conversion represents magenta.

After performing the processing at Step S21, the signal adjuster 414 performs processing at Step S24.

If the brightness is lower than the predetermined threshold Vth (such as 0.5) (No at Step S18), the signal adjuster 414 sets 0 to the saturation S' after the conversion (Step S22). The predetermined threshold Vth serves as reference brightness.

After Step S22, the signal adjuster 414 sets 0 to the hue obtained at Step S17 (Step S23). After performing the processing at Step S23, the signal adjuster 414 performs the processing at Step S24.

The signal adjuster 414 sets 1 to brightness V' in the HSV space after the conversion. The signal adjuster 414 calculates [R', G', B'] as RGB gradation values from [H', S', V'] after the conversion (Step S24).

The signal adjuster 414 transmits [R', G', B'] as the second pixel input signal VCSA to the pixel controller 42 (Step S25).

To describe the first display example, if the average gradation values of the RGB signal [R, G, B] for the background region BR1 are [57, 85, 61], the values of the HSV [H, S, V] are [129, 0.1, 0.3]. If the brightness is lower than the predetermined threshold (e.g., 0.5) (No at Step S18), the signal adjuster 414 sets 0 to the saturation S' after the conversion (Step S22). The signal adjuster 414 sets 0 to the hue obtained at Step S17 (Step S23). Subsequently, the signal adjuster 414 sets 1 to the brightness V' after the conversion. The signal adjuster 414 obtains a calculation result [255, 255, 255] as the RGB gradation values from [0, 0, 1] after the conversion (Step S24).

Second Display Example

Figure 20:
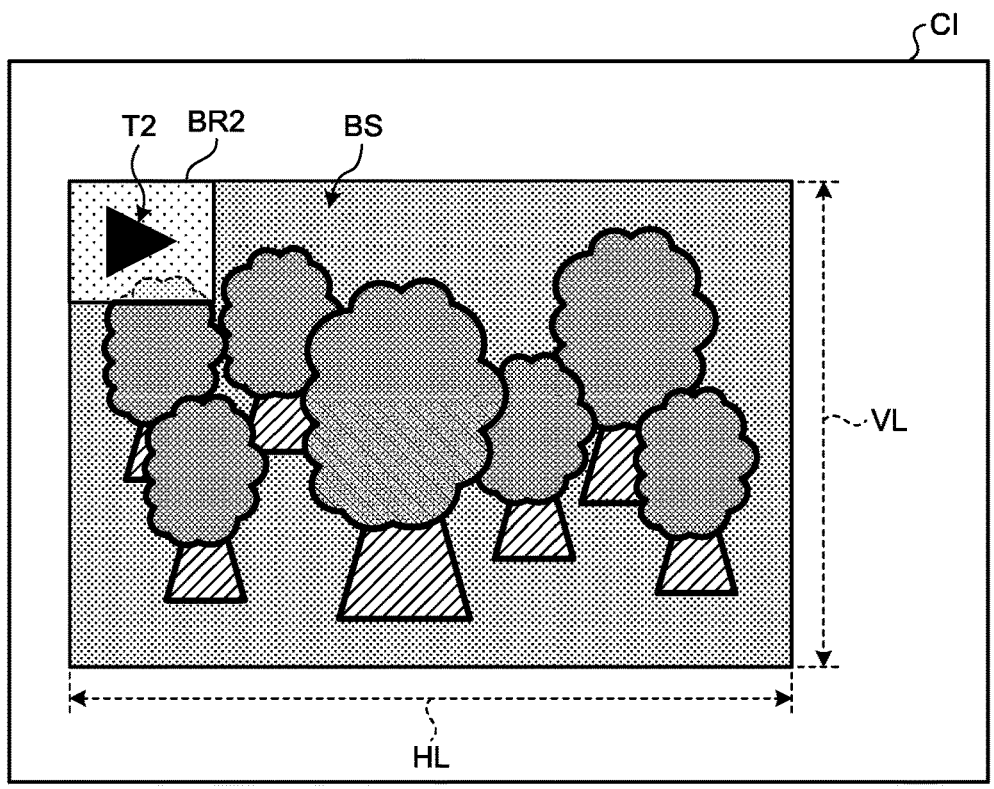
FIG. 20 is a diagram for explaining a second display example of the embodiment.

FIG. 20 is a diagram for explaining a second display example of the present embodiment. The following describes the color conversion method of the present embodiment using the second display example, with reference to FIGS. 1, 2, 13, 14 to 18, and 20, where appropriate.

The display device 1 performs the processing from Step S11 to Step S13 illustrated in FIG. 15 in the same manner as in the first display example.

The rendering region of an image T2 illustrated in FIG. 20 corresponds to the processing region A11 illustrated in FIG. 18. The background region analyzer 412 thus identifies a background region BR2 overlapping with the processing region A11. In this manner, the background region analyzer 412 identifies the background region BR2 overlapping with the rendering region of the image T2 from the calculated field angle (Step S14).

The background region analyzer 412 acquires the image information on the identified background region BR2 from the signal ELV of the background information (Step S15). The background region analyzer 412 analyzes the image information on the background region BR2 to calculate the RGB average gradation values for the background region BR2 (Step S16).

For example, in the second display example, the average gradation values of the RGB signal [R, G, B] for the background region BR2 illustrated in FIG. 20 are [137, 169, 213].

The signal adjuster 414 acquires the RGB average gradation values for the background region BR2 from the signal ELV of the background information, and then converts the RGB average gradation values for the background region BR2 into the hue, the saturation, and the brightness in the HSV space illustrated in FIG. 16 to calculate the HSV of the background (Step S17).

For example, if the average gradation values of the RGB signal [R, G, B] for the background region BR2 are [137, 169, 213], the vales of the HSV [H, S, V] are [215, 0.3, 0.8].

If the brightness is equal to or higher than the predetermined threshold Vth (e.g., 0.5) (Yes at Step S18), the signal adjuster 414 sets 1 to the saturation S' after the conversion (Step S19). The predetermined threshold Vth serves as the reference brightness.

After increasing the saturation at Step S19, the signal adjuster 414 calculates the hue (Step S20). Specifically, the signal adjuster 414 performs the hue calculation by adding 180 to the hue H obtained at Step S17 to obtain a hue [35] of a color complementary to that having the hue obtained at Step S17.

The signal adjuster 414 determines the hue H' after the conversion according to one of the hue classifications illustrated in FIG. 17 stored in the storage 413 (Step S21).

According to the first hue classification, the hue [35] of the complementary color obtained at Step S19 is identified by the hue range H1 from among the hue ranges H1, H2, H3, H4, H5, and H6 illustrated in FIG. 17. As a result, H' after the conversion represents primary red. In the same manner, according to the second hue classification, the hue [35] of the complementary color obtained at Step S19 is identified by the hue range H11 illustrated in FIG. 17. As a result, H' after the conversion represents primary red.

Subsequently, the signal adjuster 414 sets 1 to the brightness V' in the HSV space after the conversion. The signal adjuster 414 obtains a calculation result [255, 0, 0] as the RGB gradation values from [0, 1, 1] after the conversion (Step S24).

Alternatively, at Step S21, according to the third hue classification, the hue [35] of the complementary color obtained at Step S19 is identified by the hue range H21 from among the hue ranges H21, H22, and H23 illustrated in FIG. 17. As a result, H' after the conversion represents primary yellow.

Subsequently, the signal adjuster 414 sets 1 to the brightness V' in the HSV space after the conversion. The signal adjuster 414 obtains a calculation result [255, 255, 0] as the RGB gradation values from [60, 1, 1] after the conversion (Step S24).

As described above in the first display example and the second display example, the display controller 5 of the present embodiment controls the color of each of the image T1 and the image T2 overlapping with the background BS according to the color of the background BS viewed through the first translucent substrate 10 and the second translucent substrate 20. This configuration makes the color of the background different from that of the displayed image, thereby increasing the visibility of the images T1 and T2 displayed on the display panel 2.

The color of the image T1 is white, and the background region BR1 overlapping with the image T1 has low brightness. This increases the visibility of the image T1 against the background region BR1.

The color of the image T2 is a complementary color of the color represented by the RGB average gradation values of the background region BR2 overlapping with the image T2. This increases the visibility of the image T2 against the background region BR2.

The color of the image T2 has saturation of 1 in the HSV space, and therefore is a primary color. This increases the visibility of the image T2 against the background region BR2. The color of the image T2 has brightness of 1 in the HSV space. This increases the visibility of the image T2 against the background region BR2.

Third Display Example

Figure 21:
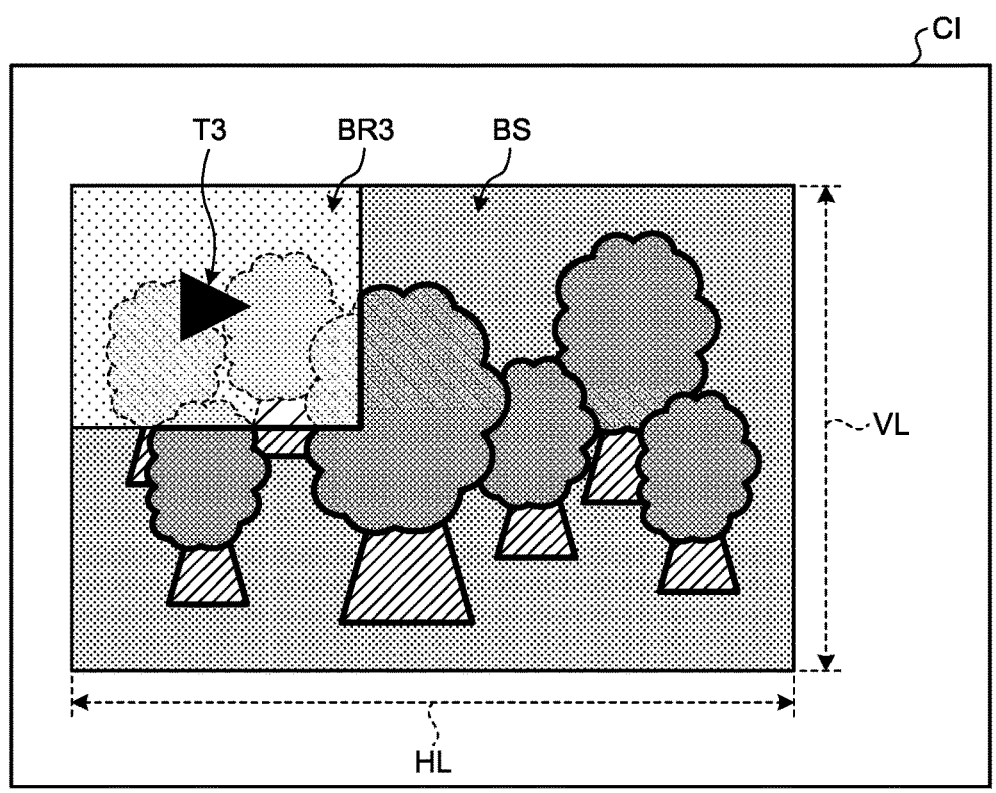
FIG. 21 is a diagram for explaining a third display example of the embodiment.

FIG. 21 is a diagram for explaining a third display example of the present embodiment. The rendering region of an image T3 illustrated in FIG. 21 overlaps with the processing regions A11, A12, A21, and A22 illustrated in FIG. 18. In the third display example, the background region analyzer 412 identifies a background region BR3 overlapping with the rendering region of the image T3 from the calculated field angle (Step S14) to find that the background region BR3 corresponds to the processing regions A11, A12, A21, and A22 illustrated in FIG. 18.

Fourth Display Example

Figure 22:
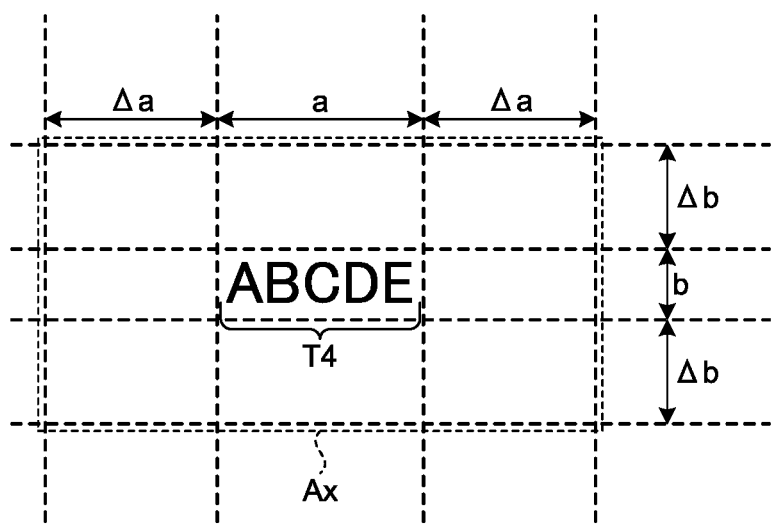
FIG. 22 is a diagram for explaining a fourth display example of the embodiment.

FIG. 22 is a diagram for explaining a fourth display example of the present embodiment. In the fourth display example, the background region analyzer 412 does not divide the display region in advance as illustrated in FIG. 18. The background region analyzer 412 calculates the area of a rendering region occupied by an image T4 by multiplying a maximum horizontal length a of the image T4 by a maximum vertical length b of the image T4 to obtain a processing region. Alternatively, the background region analyzer 412 calculates the area of the image T4 by multiplying the maximum horizontal length a of the image T4 by the maximum vertical length b of the image T4, and further adding margin region lengths Δa and Δb to the resultant value to obtain the area of a processing region Ax, which is expressed by Expression (3) below.

$$Ax=(a+\Delta a \times 2) \times (b+\Delta b \times 2) \quad (3)$$

The margin region defined by the margin region lengths Δa and Δb is not necessarily provided. Providing the margin region allows contrast information in the margin region to be reflected in the color of the image T4, thereby increasing the visibility. For example, when the margin region length Δa is from 2 mm to 10 mm inclusive and the margin region length Δb is from 2 mm to 10 mm inclusive, the visibility of the image T4 increases.

The following describes the color conversion method of the present embodiment using the fourth display example, with reference to FIGS. 1, 2, 13, 14 to 18, and 22, where appropriate. The display device 1 performs the processing from Step S11 to Step S13 illustrated in FIG. 15 in the same manner as in the first display example.

The image T4 illustrated in FIG. 22 corresponds to the processing region Ax described above. The background region analyzer 412 identifies a background region overlapping with the processing region Ax. In this manner, the background region analyzer 412 identifies the background region overlapping with the image T4 from the calculated field angle (Step S14).

The background region analyzer 412 acquires the image information on the identified background region from the signal ELV of the background information (Step S15). The background region analyzer 412 analyzes the image information on the background region to calculate the RGB average gradation values of the background region (Step S16).

For example, in the fourth display example, the average gradation values of the RGB signal [R, G, B] of the background region Ax illustrated in FIG. 22 are [163, 120, 7].

The signal adjuster 414 acquires the RGB average gradation values of the background region Ax from the signal ELV of the background information, and then converts the RGB average gradation values of the background region Ax into the hue, the saturation, and the brightness in the HSV space illustrated in FIG. 16 to calculate the HSV of the background (Step S17).

For example, if the average gradation values of the RGB signal [R, G, B] of the background region Ax are [163, 120, 7], the values of the HSV [H, S, V] are [43, 0.61, 0.64].

If the brightness is equal to or higher than the predetermined threshold Vth (e.g., 0.5) (Yes at Step S18), the signal adjuster 414 sets 1 to the saturation S' after the conversion (Step S19).

After increasing the saturation at Step S19, the signal adjuster 414 calculates the hue (Step S20). Specifically, the signal adjuster 414 performs the hue calculation by adding 180 to the hue H obtained at Step S17 so as to obtain a hue [223] of a color complementary to the color having the hue obtained at Step S17.

The signal adjuster 414 determines the hue H' after the conversion according to one of the hue classifications illustrated in FIG. 17 stored in the storage 413 (Step S21).

According to the second hue classification, the hue [223] of the complementary color obtained at Step S19 is identified by the hue range H13 illustrated in FIG. 17. As a result, H' after the conversion represents primary blue.

Subsequently, the signal adjuster 414 sets 1 to the brightness V' in the HSV space after the conversion. The signal adjuster 414 obtains a calculation result [0, 0, 255] as the RGB gradation values from [240, 1, 1] after the conversion (Step S24).

As described above, the display controller 5 identifies the background region Ax overlapping with the image T4 in a range covering the entire image T4. According to the fourth display example of the present embodiment, one background region overlaps with the image T4, and the image T4 is displayed in a unified color (e.g., blue). This configuration can suppress a feeling of strangeness caused by partial variations in color of the image T4.

Fifth Display Example

Figure 23:
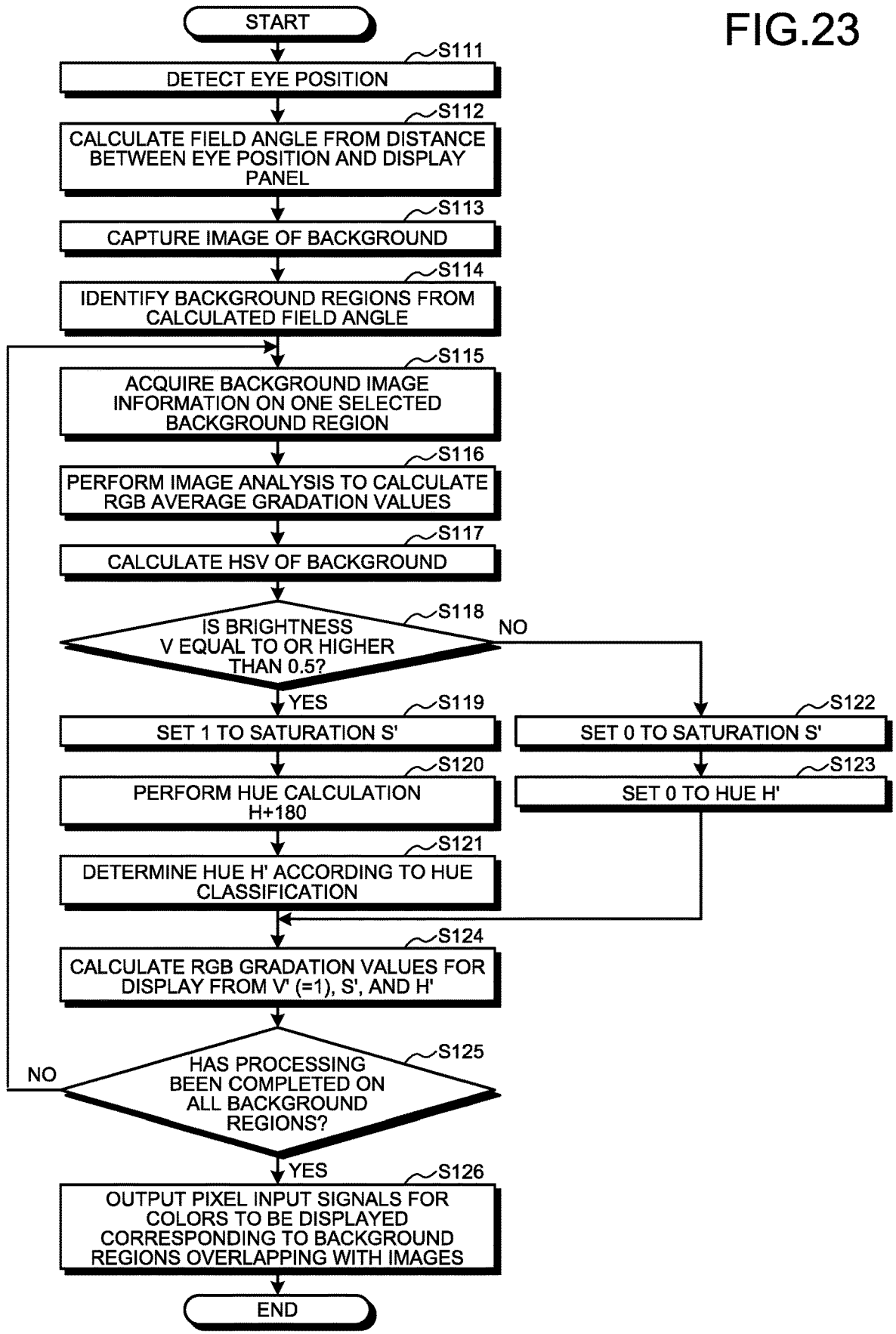
FIG. 23 is a flowchart for explaining a color conversion method of modifications of the embodiment.
Figure 24:
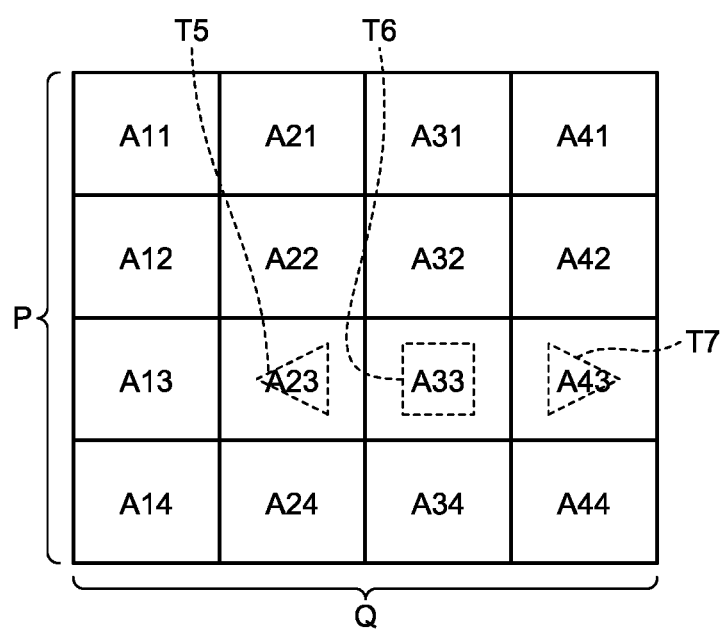
FIG. 24 is a diagram for explaining a plurality of background regions obtained by dividing the display region.

FIG. 23 is a flowchart for explaining a color conversion method of modifications of the present embodiment. FIG. 24 is a diagram for explaining a plurality of background regions obtained by dividing the display region. FIG. 25 is a diagram for explaining a fifth display example of the present embodiment. The following describes the color conversion method of the present embodiment using the fifth display example, with reference to FIGS. 1, 2, 13, 14, 16, 17, and 23 to 25, where appropriate.

The display device 1 performs processing from Step S111 to Step S113 illustrated in FIG. 23 in the same manner as the processing from Step S11 to Step S13 illustrated in FIG. 15. The processing from Step S111 to Step S113 will not be described in detail.

The background region analyzer 412 divides the display region into (P×Q) processing regions A11, A12, A13, A14, A21, A22, A23, A24, A31, A32, A33, A34, A41, A42, A43, and A44, as illustrated in FIG. 24. In the fifth display example, images T5, T6, and T7 illustrated in FIG. 24 correspond to the processing regions A23, A33, and A43 illustrated in FIG. 24.

The background region analyzer 412 identifies the processing regions A11, A12, A13, A14, A21, A22, A23, A24, A31, A32, A33, A34, A41, A42, A43, and A44 as a plurality of background regions obtained by dividing the display region (Step S114). Hereinafter, the background regions are denoted by the same reference numerals as those of the processing regions.

The background region analyzer 412 acquires the background image information on one selected background region from the signal ELV of the background information (Step S115). The background region analyzer 412 analyzes the background image information on the background region to calculate the RGB average gradation values of the background region (Step S116).

The signal adjuster 414 acquires the RGB average gradation values of the background region from the signal ELV of the background information, and then converts the RGB average gradation values of the background region into the hue, the saturation, and the brightness in the HSV space illustrated in FIG. 16 to calculate the HSV of the background (Step S117).

If the brightness is equal to or higher than the predetermined threshold Vth (e.g., 0.5) (Yes at Step S118), the signal adjuster 414 sets 1 to the saturation S' after the conversion (Step S119).

After increasing the saturation at Step S119, the signal adjuster 414 calculates the hue (Step S120). Specifically, the signal adjuster 414 performs the hue calculation by adding 180 to the hue H obtained at Step S117 to obtain a hue of a color complementary to the color having the hue obtained at Step S117.

The signal adjuster 414 determines the hue H' after the conversion according to one of the hue classifications illustrated in FIG. 17 stored in the storage 413 (Step S121). After performing the processing at Step S121, the signal adjuster 414 performs processing at Step S124.

If the brightness is lower than the predetermined threshold Vth (e.g., 0.5) (No at Step S118), the signal adjuster 414 sets 0 to the saturation S' after the conversion (Step S122).

After Step S122, the signal adjuster 414 sets 0 to the hue obtained at Step S117 (Step S123). After performing the processing at Step S123, the signal adjuster 414 performs the processing at Step S124.

At Step S124, the signal adjuster 414 sets 1 to the brightness V' in the HSV space after the conversion. The signal adjuster 414 calculates the RGB gradation values for display from [H', S', V'] after the conversion (Step S124).

If processing has not been completed on all the background regions (No at Step S125), the signal adjuster 414 returns the processing to Step S115, and selects the next background region. If the processing has been completed on all the background regions (Yes at Step S125), the signal adjuster 414 outputs pixel input signals for colors to be displayed corresponding to background regions overlapping with images (Step S126).

The background region A11 will be described with reference to FIG. 25. For example, in the background region A11 in a table T11 illustrated in FIG. 25, the average gradation values of the RGB signal [R, G, B] are [75, 81, 18] (Step S116). In the background region A11 in a table T12 illustrated in FIG. 25, the values of the HSV [H, S, V] are [66, 0.25, 0.3] (Step S117). Because the brightness in the background region A11 is lower than the predetermined threshold (e.g., 0.5) (No at Step S118), the signal adjuster 414 sets 0 to the saturation S' after the conversion (Step S122). The signal adjuster 414 sets 0 to the hue obtained at Step S117 (Step S123). Subsequently, the signal adjuster 414 sets 1 to the brightness V' in the HSV space after the conversion. As a result, the values of [H', S', V'] after the conversion are set to [0, 0, 1], as given in a table T13 illustrated in FIG. 25. The signal adjuster 414 obtains a calculation result [255,255,255] as the RGB gradation values from [0, 0, 1] after the conversion (Step S124). As illustrated in FIG. 25, the background regions A21, A31, A41, A12, A22, A13, A23, A14, A24, A34, and A44 are processed in the same manner as the background region A11.

For example, the background region A32 will be described with reference to FIG. 25. In the background region A32 in the table T11 illustrated in FIG. 25, the average gradation values of the RGB signal [R, G, B] are [221, 143, 8] (Step S116). In the background region A32 in the table T12 illustrated in FIG. 25, the values of the HSV [H, S, V] are [38, 0.84, 0.9] (Step S117). Because the brightness in the background region A32 is equal to or higher than the predetermined threshold (e.g., 0.5) (Yes at Step S118), the signal adjuster 414 sets 1 to the saturation S' after the conversion (Step S122). The signal adjuster 414 performs the hue calculation by adding 180 to the hue obtained at Step S117 to obtain a hue of a color complementary to the color having the hue obtained at Step S117 (Step S120). The hue [218] of the complementary color obtained at Step S120 is identified by the hue range H13 from among the hue ranges H11, H12, and H13 illustrated in FIG. 17. As a result, H' after the conversion represents primary blue [240] (Step S121).

Subsequently, the signal adjuster 414 sets 1 to the brightness V' in the HSV space after the conversion. The signal adjuster 414 obtains a calculation result [0, 0, 255] as the RGB gradation values from [240, 1, 1] after the conversion (Step S124). The background regions A42, A33, and A43 are processed in the same manner as the background region A32.

If the processing has been completed on all the background regions (Yes at Step S125), the signal adjuster 414 outputs pixel input signals for colors to be displayed corresponding to the background regions A23, A33, and A43 overlapping with the images T5, T6, and T7 illustrated in FIG. 24 (Step S126). Specifically, the color of the image T5 is obtained as white having the RGB gradation values of [255, 255, 255] from a table T14 of FIG. 25; the color of the image T6 is obtained as blue having the RGB gradation values of [0, 0, 255] from the table T14 of FIG. 25; and the color of the image T7 is obtained as blue having the RGB gradation values of [0, 0, 255] from the table T14 of FIG. 25.

As described above, the display controller 5 calculates in advance the color to be displayed for each of the background regions A11, A21, A31, A41, A12, A22, A13, A23, A14, A24, A34, and A44 obtained by dividing the display region, as illustrated in the table T14 of FIG. 25, and controls the colors to be displayed corresponding to the background regions A23, A33, and A43 overlapping with the images T5, T6, and T7, respectively, as colors of the images T5, T6, and T7.

With this configuration, an optimal color for each of the background regions divided in advance is determined, and the display color of each image changes depending on in which background region the image is displayed. In a case where a plurality of images are displayed, adjacent images astride adjacent background regions may have different colors depending on different background regions. In this case, the images are displayed in colors that are easily viewed depending on respective background regions.

In the present embodiment, the display color of the image is determined based on the average gradation values of the RGB signal, but the present disclosure is not limited thereto. The display color of the image may be determined based on gradation values obtained by weighting the values of [R, G, B], instead of the average gradation values of the RGB signal.

First Modification

Figure 26:
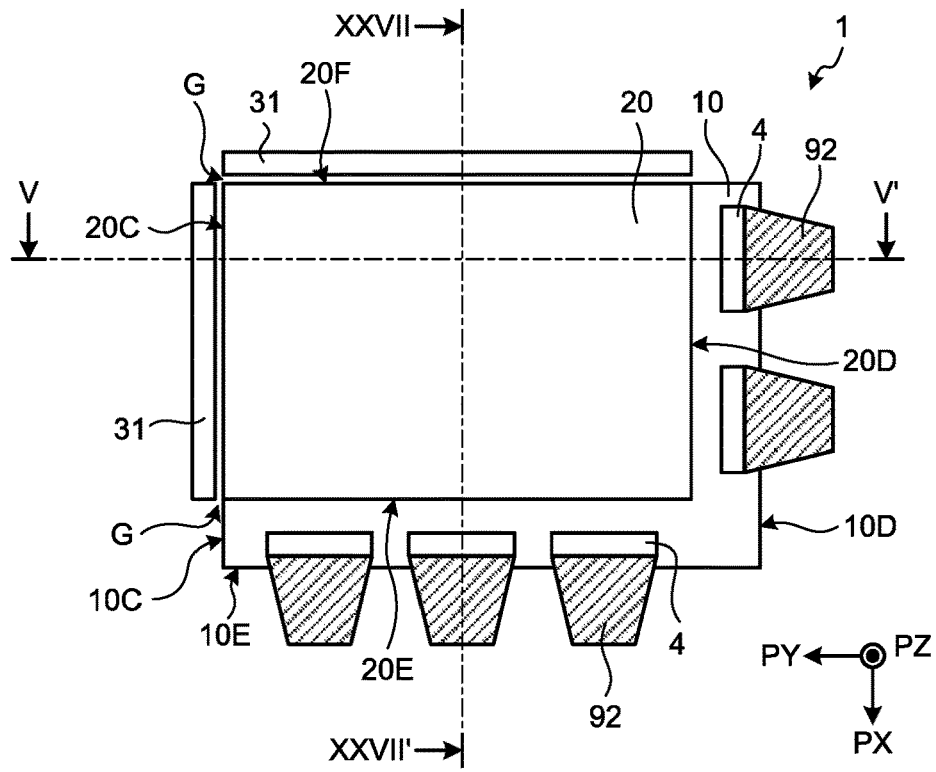
FIG. 26 is a plan view illustrating a plane of a display device according to a first modification of the embodiment.
Figure 27:
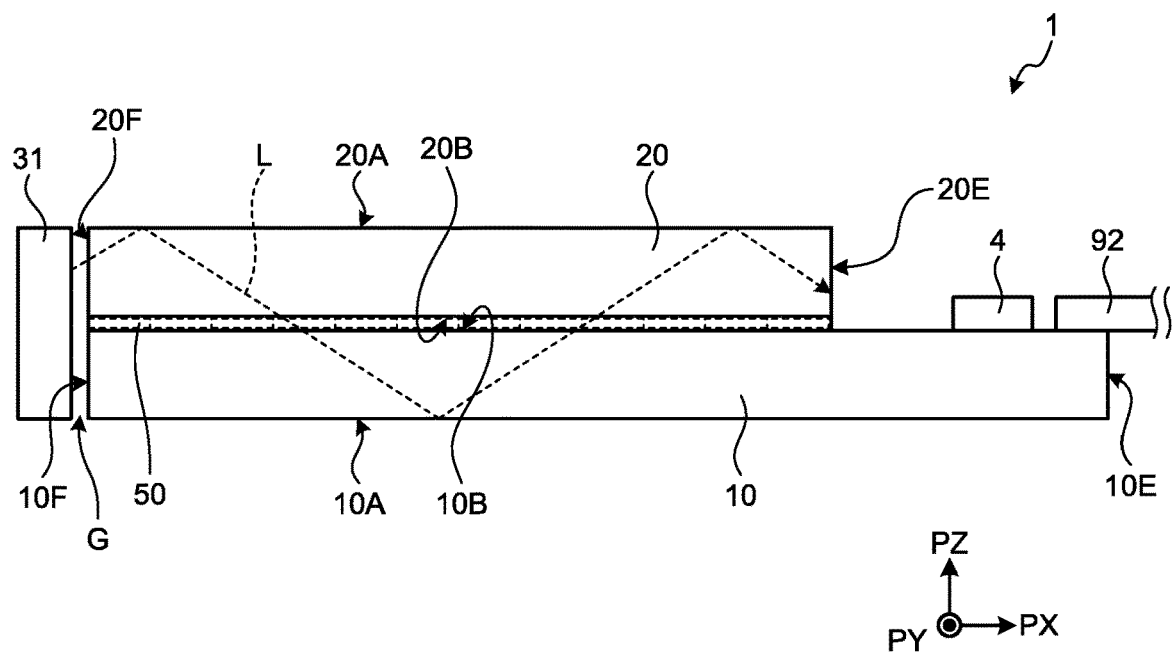
FIG. 27 is a sectional view along XXVII-XXVII' in FIG. 26.

FIG. 26 is a plan view illustrating a plane of a display device according to a first modification of the present embodiment. FIG. 27 is a sectional view along XXVII-XXVII' in FIG. 26. The same components as those described above in the present embodiment are denoted by the same reference numerals, and the description thereof will not be repeated. Since the section along V-V' in FIG. 26 is the same as that of the display device of the present embodiment illustrated in FIG. 5, the description thereof will not be repeated.

As illustrated in FIGS. 26 and 27, one of the light emitters 31 faces the fourth side surface 20F of the second translucent substrate 20. As illustrated in FIG. 27, the light emitter 31 emits the light-source light L to the fourth side surface 20F of the second translucent substrate 20. The fourth side surface 20F of the second translucent substrate 20 facing the light emitter 31 serves as a light incident surface. The gap G is provided between the light emitter 31 and the light incident surface. The gap G forms an air layer.

As illustrated in FIG. 27, the light-source light L emitted from the light emitter 31 propagates in a direction away from the fourth side surface 20F while being reflected by the first principal surface 10A of the first translucent substrate 10 and the first principal surface 20A of the second translucent substrate 20.

The display device 1 according to the first modification of the present embodiment includes the first translucent substrate 10, the second translucent substrate 20, the liquid crystal layer 50, and the light emitters 31. One of the two light emitters 31 faces the first side surface 20C of the second translucent substrate 20, and the other of the two light emitters 31 faces the fourth side surface 20F of the second light-transmitting substrate 20. With this configuration, the light quantity of in-plane light emitted from the two light emitters 31 and propagating in the display panel 2 increases. The uniformity of the in-plane light propagating in the display panel 2 also increases. A region P1 and a region P2 illustrated in FIG. 6 differ in distance from the light emitter 31, and therefore differ in in-plane light quantity. In contrast, the display device 1 according to the first modification of the present embodiment causes light to propagate from two intersecting directions, thereby reducing the difference in in-plane light quantity.

Second Modification

Figure 28:
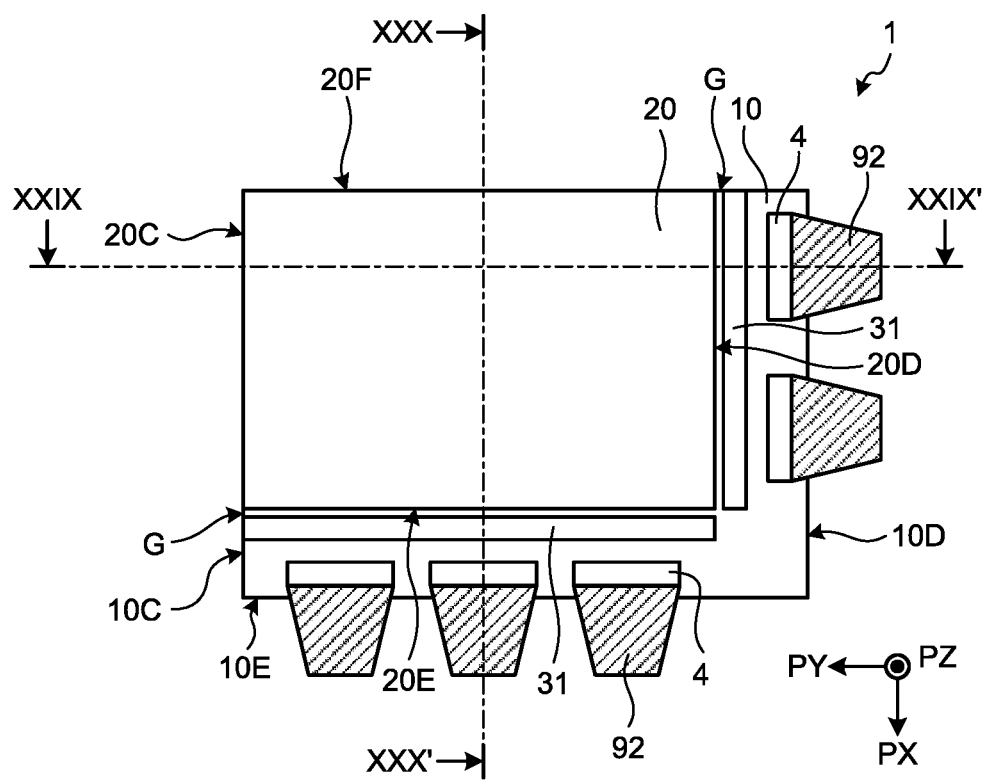
FIG. 28 is a plan view illustrating a plane of a display device according to a second modification of the embodiment.
Figure 29:
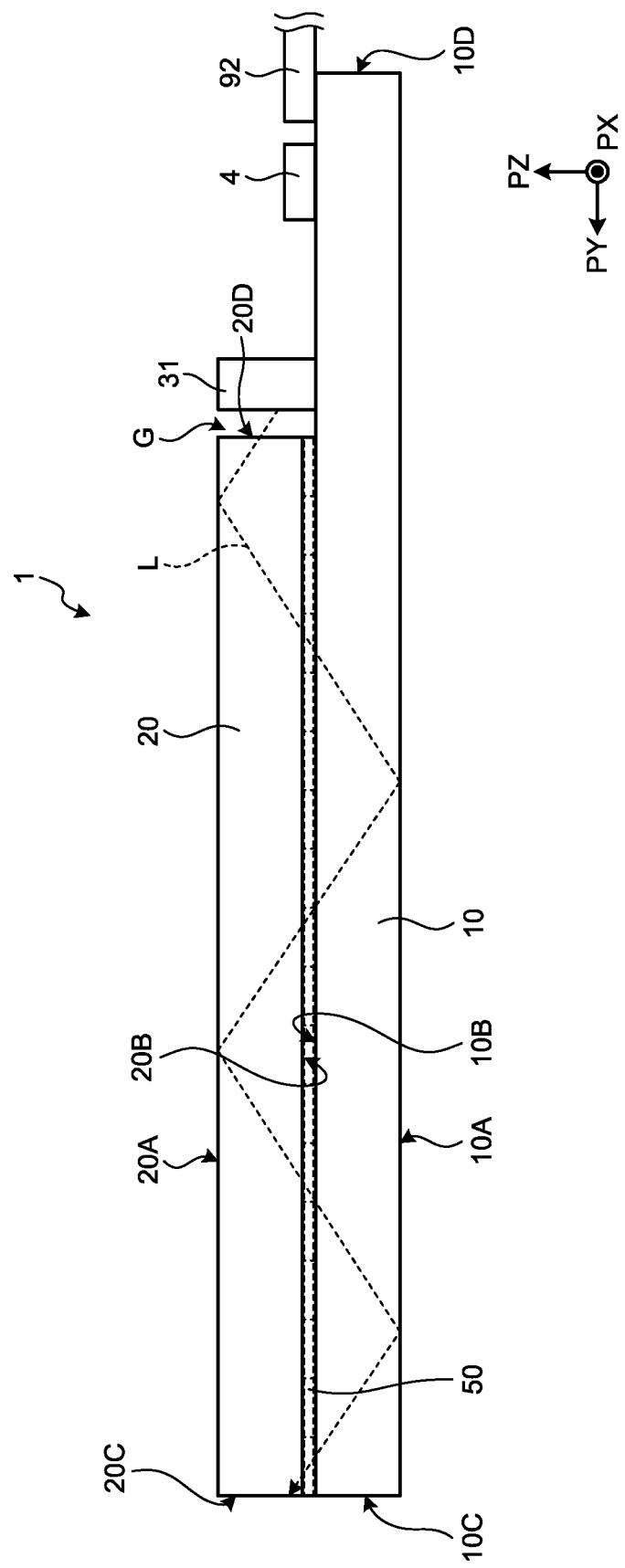
FIG. 29 is a sectional view along XXIX-XXIX' in FIG. 28.
Figure 30:
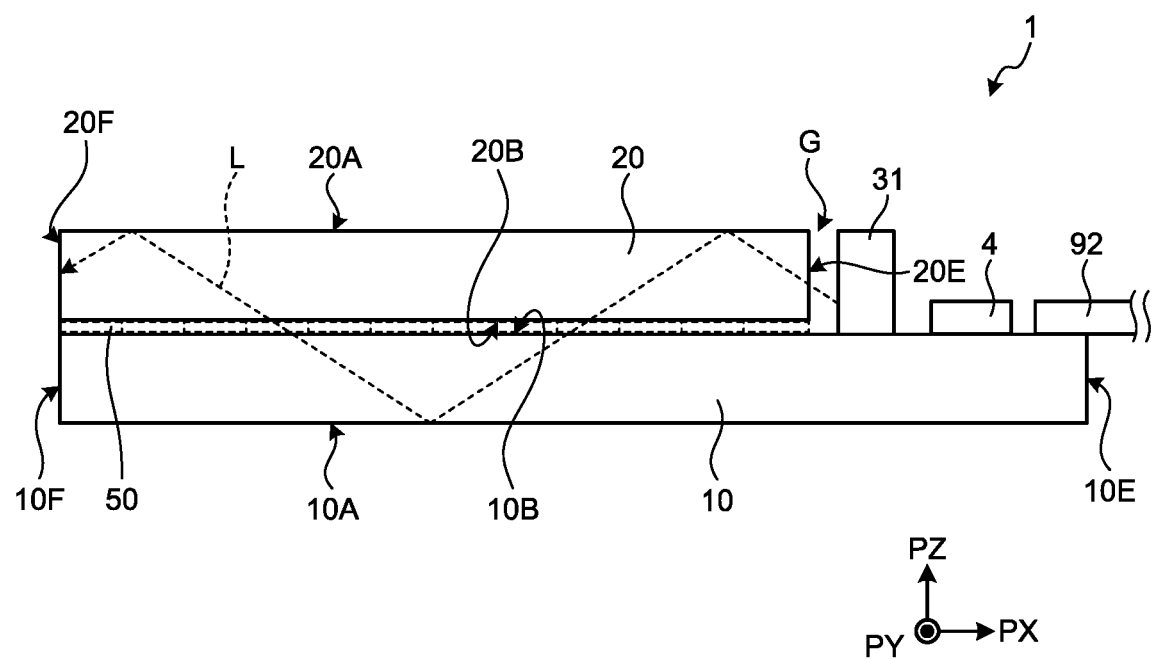
FIG. 30 is a sectional view along XXX-XXX' in FIG. 28.

FIG. 28 is a plan view illustrating a plane of a display device according to a second modification of the present embodiment. FIG. 29 is a sectional view along XXIX-XXIX' in FIG. 28. FIG. 30 is a sectional view along XXX-XXX' in FIG. 28. The same components as those described above in the present embodiment or the modification thereof are denoted by the same reference numerals, and the description thereof will not be repeated.

As illustrated in FIGS. 28 and 29, one of the light emitters 31 faces the second side surface 20D of the second translucent substrate 20. As illustrated in FIG. 29, the light emitter 31 emits the light-source light L to the second side surface 20D of the second translucent substrate 20. The second side surface 20D of the second translucent substrate 20 facing the light emitter 31 serves as a light incident surface. The gap G is provided between the light emitter 31 and the light incident surface. The gap G forms an air layer.

As illustrated in FIG. 29, the light-source light L emitted from the light emitter 31 propagates in a direction away from the second side surface 20D while being reflected by the first principal surface 10A of the first translucent substrate 10 and the first principal surface 20A of the second translucent substrate 20.

As illustrated in FIGS. 28 and 30, the other of the light emitters 31 faces the third side surface 20E of the second translucent substrate 20. As illustrated in FIG. 30, the light emitter 31 emits the light-source light L to the third side surface 20E of the second translucent substrate 20. The third side surface 20E of the second translucent substrate 20 facing the light emitter 31 serves as a light incident surface. The gap G is provided between the light emitter 31 and the light incident surface. The gap G forms an air layer.

As illustrated in FIG. 30, the light-source light L emitted from the light emitter 31 propagates in a direction away from the third side surface 20E while being reflected by the first principal surface 10A of the first translucent substrate 10 and the first principal surface 20A of the second translucent substrate 20.

The display device 1 according to the second modification of the present embodiment includes the first translucent substrate 10, the second translucent substrate 20, the liquid crystal layer 50, and the light emitters 31. One of the two light emitters 31 faces the second side surface 20D of the second translucent substrate 20, and the other of the two light emitters 31 faces the third side surface 20E of the second light-transmitting substrate 20. With this configuration, the light quantity of the in-plane light emitted from the two light emitters 31 and propagating in the display panel 2 increases. The uniformity of the in-plane light propagating in the display panel 2 also increases. The region P1 and the region P2 illustrated in FIG. 6 differ in distance from the light emitter 31, and therefore differ in in-plane light quantity. In contrast, the display device 1 according to the second modification of the present embodiment causes light to propagate from two intersecting directions, thereby reducing the difference in in-plane light quantity.

In the same manner as the present embodiment, the display device 1 according to the second modification of the present embodiment does not include a backlight device or a reflecting plate on the first principal surface 10A side of the first translucent substrate 10 or on the first principal surface 20A side of the second translucent substrate 20. As a result, the background on the first principal surface 20A side of the second translucent substrate 20 is visible from the first principal surface 10A of the first translucent substrate 10, and the background on the first principal surface 10A side of the first translucent substrate 10 is visible from the first principal surface 20A of the second translucent substrate 20.

The preferred embodiment of the present disclosure has been described above. The present disclosure is, however, not limited to the embodiment described above. The content disclosed in the embodiment is merely an example, and can be variously modified within the scope not departing from the gist of the present disclosure. Any modifications appropriately made within the scope not departing from the gist of the present disclosure also naturally belong to the technical scope of the present disclosure. All the technology that can be carried out by those skilled in the art through appropriate design modifications based on the disclosure described above also belongs to the technical scope of the present disclosure as long as the technology includes the gist of the present disclosure.

For example, the image described above is not limited to certain display contents, such as characters, symbols, lines, and drawing patterns.

The display panel 2 may be, for example, a passive-matrix panel without any switching element. The passive-matrix panel includes: first electrodes extending in the PX direction in the plan view; second electrodes extending in the PY direction in the plan view; and wiring electrically coupled to the first electrodes or the second electrodes. The first and the second electrodes and the wiring are made of, for example, ITO. For example, the first translucent substrate 10 including the first electrodes and the second translucent substrate 20 including the second electrodes face each other with the liquid crystal layer 50 interposed therebetween.

Although the example has been described in which the first and the second orientation films 55 and 56 are vertical orientation films, the first and the second orientation films 55 and 56 may be horizontal orientation films. The first and the second orientation films 55 and 56 only need to have a function to orient monomers in a predetermined direction when polymerizing the monomers. This allows the monomers to become polymers oriented in the predetermined direction. When the first and the second orientation films 55 and 56 are the horizontal orientation films, the direction of the optical axis Ax1 of the bulk 51 is equal to the direction of the optical axis Ax2 of the fine particles 52 and is orthogonal to the PZ direction when no voltage is applied between the pixel electrode 16 and the common electrode 22. The direction orthogonal to the PX direction corresponds to the PZ direction or the PY direction along a side of the first translucent substrate 10 in the plan view.

The higher-level controller 9 illustrated in FIG. 2 may use the central processing unit (CPU) to perform various functions, such as the functions of the analyzer 41, the image output portion 91, the background output portion 94, and the field angle calculator 93. Alternatively, the imaging devices 61 and 62 may be coupled to the drive circuit 4 through the flexible substrate 95 illustrated in FIG. 1, and the drive circuit 4 may include the background output portion 94 and the field angle calculator 93.

The present disclosure includes the following aspects:
(1) A display device comprising:
  a first translucent substrate;
  a second translucent substrate facing the first translucent substrate;
  a liquid crystal layer including polymer dispersed liquid crystal sealed between the first translucent substrate and the second translucent substrate;
  at least one light emitter facing at least one of a side surface of the first translucent substrate or a side surface of the second translucent substrate; and a display controller that controls a color of an image overlapping with a background viewed through the first translucent substrate and the second translucent substrate according to a color of the background.
(2) The display device according to (1), wherein
  the first translucent substrate has a first principal surface and a second principal surface that is a plane parallel to the first principal surface,
  the second translucent substrate has a first principal surface and a second principal surface that is a plane parallel to the first principal surface, and
  when the polymer dispersed liquid crystal is in a non-scattering state, a background on the first principal surface side of the second translucent substrate is visible from the first principal surface of the first translucent substrate, or a background on the first principal surface side of the first translucent substrate is visible from the first principal surface of the second translucent substrate.
(3) The display device according to (1) or (2), further comprising a first electrode and a second electrode with the liquid crystal layer interposed therebetween, wherein
  the at least one light emitter sequentially emits at least light of a first color, light of a second color, and light of a third color using a field-sequential system, and
  the display controller sequentially applies a voltage to the first electrode according to gradation values of the color of the image in synchronization with the emission of the light of the first color, the light of the second color, or the light of the third color.
(4) The display device according to any one of (1) to (3), wherein the color of the image is a color complementary to a color represented by red-green-blue (RGB) average gradation values of a target background region overlapping with the image.
(5) The display device according to (4), wherein the color of the image is a primary color when the color represented by the RGB average gradation values of the target background region overlapping with the image has a brightness value equal to or higher than a reference brightness value.
(6) The display device according to (4) or (5), further comprising a storage that stores in advance information on a predetermined hue classification, wherein
  the color complementary to the color represented by the RGB average gradation values of the target background region overlapping with the image is set based on the information on the hue classification and the color complementary to the color represented by the RGB average gradation values of the target background region overlapping with the image, and
  the display controller controls the complementary color as the color of the image.
(7) The display device according to any one of (1) to (3), wherein the color of the image is white.
(8) The display device according to (7), wherein the color of the image is white when a color represented by RGB average gradation values of a target background region overlapping with the image has a brightness value lower than a reference brightness value.
(9) The display device according to any one of (1) to (8), wherein the color of the image has a brightness value of 1 in a hue-saturation-value (HSV) space.
(10) The display device according to any one of (1) to (9), wherein the display controller identifies a target background region overlapping with the image, and controls the color of the image according to the color of the target background in the background region.
(11) The display device according to (10), wherein the display controller identifies the target background region overlapping with the image in a range covering the entire image.
(12) The display device according to (10), wherein the display controller identifies the target background region overlapping with the image from among a plurality of background regions obtained by dividing a display region.
(13) The display device according to any one of (1) to (9), wherein the display controller calculates in advance a color to be displayed for each of the background regions obtained by dividing the display region, and controls the color to be displayed corresponding to a target background region overlapping with the image as the color of the image.

(14) The display device according to any one of (1) to (13), further comprising:
a first imaging device that captures an image on a viewer side;
a second imaging device that captures an image of the background;
a field angle calculator that calculates a field angle from the image on the viewer side; and
a background output portion that generates background information within a range covered by a display region having the field angle from the image of the background.

What is claimed is:

1. A display device comprising:
   a first translucent substrate;
   a second translucent substrate facing the first translucent substrate;
   a liquid crystal layer including polymer dispersed liquid crystal sealed between the first translucent substrate and the second translucent substrate;
   at least one light emitter facing at least one of a side surface of the first translucent substrate or a side surface of the second translucent substrate; and
   a display controller that controls a color of an image overlapping with a background viewed through the first translucent substrate and the second translucent substrate according to a color of the background,
   wherein the color of the image is a color complementary to a color represented by red-green-blue (RGB) average gradation values of a target background region overlapping with the image.

2. The display device according to claim 1, wherein
   the first translucent substrate has a first principal surface and a second principal surface that is a plane parallel to the first principal surface,
   the second translucent substrate has a first principal surface and a second principal surface that is a plane parallel to the first principal surface, and
   when the polymer dispersed liquid crystal is in a non-scattering state, a background on the first principal surface side of the second translucent substrate is visible from the first principal surface of the first translucent substrate, or a background on the first principal surface side of the first translucent substrate is visible from the first principal surface of the second translucent substrate.

3. The display device according to claim 1, further comprising a first electrode and a second electrode with the liquid crystal layer interposed therebetween, wherein
   the at least one light emitter sequentially emits at least light of a first color, light of a second color, and light of a third color using a field-sequential system, and
   the display controller sequentially applies a voltage to the first electrode according to gradation values of the color of the image in synchronization with the emission of the light of the first color, the light of the second color, or the light of the third color.

4. The display device according to claim 1, wherein the color of the image is a primary color when the color represented by the RGB average gradation values of the target background region overlapping with the image has a brightness value equal to or higher than a reference brightness value.

5. The display device according to claim 1, further comprising a storage that stores in advance information on a predetermined hue classification, wherein
   the color complementary to the color represented by the RGB average gradation values of the target background region overlapping with the image is set based on the information on the hue classification and the color complementary to the color represented by the RGB average gradation values of the target background region overlapping with the image, and
   the display controller controls the complementary color as the color of the image.

6. The display device according to claim 1, wherein the color of the image is white.

7. The display device according to claim 6, wherein the color of the image is white when the color represented by RGB average gradation values of the target background region overlapping with the image has a brightness value lower than a reference brightness value.

8. The display device according to claim 1, wherein the color of the image has a brightness value of 1 in a hue-saturation-value (HSV) space.

9. A display device comprising:
   a first translucent substrate;
   a second translucent substrate facing the first translucent substrate;
   a liquid crystal layer including polymer dispersed liquid crystal sealed between the first translucent substrate and the second translucent substrate;
   at least one light emitter facing at least one of a side surface of the first translucent substrate or a side surface of the second translucent substrate; and
   a display controller that controls a color of an image overlapping with a background viewed through the first translucent substrate and the second translucent substrate according to a color of the background,
   wherein the display controller identifies a target background region overlapping with the image, and controls the color of the image according to the color of the background in the target background region.

10. The display device according to claim 9, wherein le display controller identities the target background region overlapping with the image in a range covering the entire image.

11. The display device according to claim 9, wherein the display controller identifies the target background region overlapping with the image from among a plurality of background regions obtained by dividing a display region.

12. The display device according to claim 1, wherein the display controller calculates in advance a color to be displayed for each of a plurality of background regions obtained by dividing a display region, and controls the color to be displayed corresponding to the target background region overlapping with the image as the color of the image.

13. A display device comprising:
   a first translucent substrate:
   a second translucent substrate facing the first translucent substrate;
   a liquid crystal layer including polymer dispersed liquid crystal sealed between the first translucent substrate and the second translucent substrate;
   at least one light emitter facing at least one of a side surface of the first translucent substrate or a side surface of the second translucent substrate;
   a display controller that controls a color of an image overlapping with a background viewed through the first translucent substrate and the second translucent substrate according to a color of the background:
a first imaging device that captures an image on a viewer side;
a second imaging device that captures an image of the background;
a field angle calculator that calculates a field angle from the image on the viewer side; and
a background output portion that generates background information within a range covered by a display region having the field angle from the image of the background.

* * * * *